US011651384B2

(12) United States Patent
Tietzen et al.

(10) Patent No.: US 11,651,384 B2
(45) Date of Patent: May 16, 2023

(54) INCENTING A CONSUMER TO VIEW AN ONLINE ADVERTISEMENT OF A MERCHANT WITH WHOM THE CONSUMER WAS UNLIKELY TO HAVE MULTIPLE PRIOR TRANSACTIONS

(71) Applicant: EDATANETWORKS INC., Calgary (CA)

(72) Inventors: Terrance Patrick Tietzen, Edmonton (CA); Matthew Arnold Macpherson Bates, Beaumont (CA)

(73) Assignee: EDATANETWORKS INC., Calgary (CA)

( * ) Notice: Subject to any disclaimer, the term of this patent is extended or adjusted under 35 U.S.C. 154(b) by 0 days.

(21) Appl. No.: 16/444,315

(22) Filed: Jun. 18, 2019

(65) Prior Publication Data
US 2019/0392469 A1 Dec. 26, 2019

Related U.S. Application Data

(60) Provisional application No. 62/688,799, filed on Jun. 22, 2018.

(51) Int. Cl.
*G06Q 30/02* (2023.01)
*G06Q 30/0207* (2023.01)
*G06Q 30/0279* (2023.01)

(52) U.S. Cl.
CPC ..... *G06Q 30/0212* (2013.01); *G06Q 30/0239* (2013.01); *G06Q 30/0279* (2013.01)

(58) Field of Classification Search
None
See application file for complete search history.

(56) References Cited

U.S. PATENT DOCUMENTS

| 5,745,360 A * | 4/1998 | Leone ................... G06F 16/258 |
| | | 715/236 |
| 9,619,831 B1 * | 4/2017 | Kumar ............... G06Q 30/0253 |
| 2010/0114760 A1 * | 5/2010 | Sundarasen ............ G06Q 20/04 |
| | | 705/39 |
| 2013/0282458 A1 * | 10/2013 | Roberts .............. G06Q 30/0217 |
| | | 705/14.19 |
| 2014/0039990 A1 * | 2/2014 | Georgi ............... G06Q 30/0229 |
| | | 705/14.3 |

(Continued)

*Primary Examiner* — Marie P Brady
(74) *Attorney, Agent, or Firm* — Bradley K. DeSandro; DeSandro Law Group PLLC

(57) ABSTRACT

After a first transaction but before any subsequent transaction, a merchant communicates an incentive containing a URL to a customer to make a donation to a charity in exchange for a future transaction. The customer uses the URL to accesses and use the incentive. Data may be collected about all customers, either expressly, or from offline or online transactions between the customers and the merchants, and the data may be stored in a data storage area. All data in the data storage area may be utilized by logic tool, which may provide information, such as details of consumer behavior and analytic reporting. Matches between transactions between merchants and customers, and corresponding online activities of the customers that pertain to the merchants may be identified and used to determine the accuracy of a level of certainty of each such match to assess the efficacy of the incentive.

19 Claims, 10 Drawing Sheets

(56) References Cited

U.S. PATENT DOCUMENTS

| | | | |
|---|---|---|---|
| 2014/0136300 A1* | 5/2014 | Tietzen | G06Q 40/02 |
| | | | 705/14.1 |
| 2015/0058107 A1* | 2/2015 | Thakkar | G06Q 30/0222 |
| | | | 705/14.23 |
| 2015/0142544 A1* | 5/2015 | Tietzen | G06Q 30/0207 |
| | | | 705/14.23 |
| 2017/0098234 A1* | 4/2017 | Carlson | G06Q 30/0215 |
| 2018/0047091 A1* | 2/2018 | Ogden | G06Q 30/0261 |
| 2018/0089710 A1* | 3/2018 | Fedak | H04L 67/535 |
| 2021/0182891 A1* | 6/2021 | Daicho | G06Q 10/107 |

* cited by examiner

INCENTING A CONSUMER TO VIEW AN ONLINE ADVERTISEMENT OF A MERCHANT WITH WHOM THE CONSUMER WAS UNLIKELY TO HAVE MULTIPLE PRIOR TRANSACTIONS

CROSS REFERENCE TO RELATED APPLICATIONS

This patent application claims priority to U.S. Provisional Application Ser. No. 62/688,799, titled "Incenting A Consumer To View An Online Advertisement of A Merchant With Whom The Consumer Was Unlikely To Have Multiple Prior Transactions", filed on Jun. 22, 2018, which is incorporated herein by reference.

FIELD

The present invention relates to incenting a customer transaction in a marketing system, and more particularly relates to incenting a consumer to view an online advertisement of a merchant with whom the consumer was unlikely to have multiple prior transactions.

BACKGROUND

A merchant having a local, brick and mortar store may enjoy the sale of goods and/or services to customers who conduct in-person, card-present, brick and mortar transactions with the merchant. The merchant, however, may wish to acquaint these brick-and-mortar customers with the merchant's online presence. The merchant's goal with beginning such an acquaintance may be to increase the merchant's notoriety and reputation with its brick-and-mortar customers, to show appreciation for their brick-and-mortar purchases and/or to increase the merchant's sale of goods and/or services with those customers whose prior transactions with the merchant were limited to card-present, in-person, brick and mortar transactions. Accordingly, there is need in the relevant arts for systems and methods to incent this acquaintance.

SUMMARY

In one aspect, the present disclosure relates to a marketing system operable to promote one or more merchants and the products and services of the one or more merchants in an inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, where the one or more transactions occur between the one or more merchants and the one or more members; a transaction linking utility operable to process and analyze the transaction details and the data of the data collection server to determine the likelihood that one of the one or more transactions was conducted in person by one of the one or more members who had not previously transacted online with one of the one or more merchants; and a data mining tool operable to analyze by operation of the one or more computer processors of the data collection server, the transaction details and the data regarding the one or more members and the one or more merchants, where the data mining tool is further operable, if the likelihood is above a predetermined threshold, to generate and send an incentive to a logical address of a communication device of the one of the one or more members that includes a link, unique to the one of the one or more members, which, when followed, provides access to the incentive.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

BRIEF DESCRIPTION OF THE DRAWINGS

In the drawings, like reference characters generally refer to the same parts throughout the different views. In the following description, various implementations are described with reference to the following drawings, in which.

Figure 1:
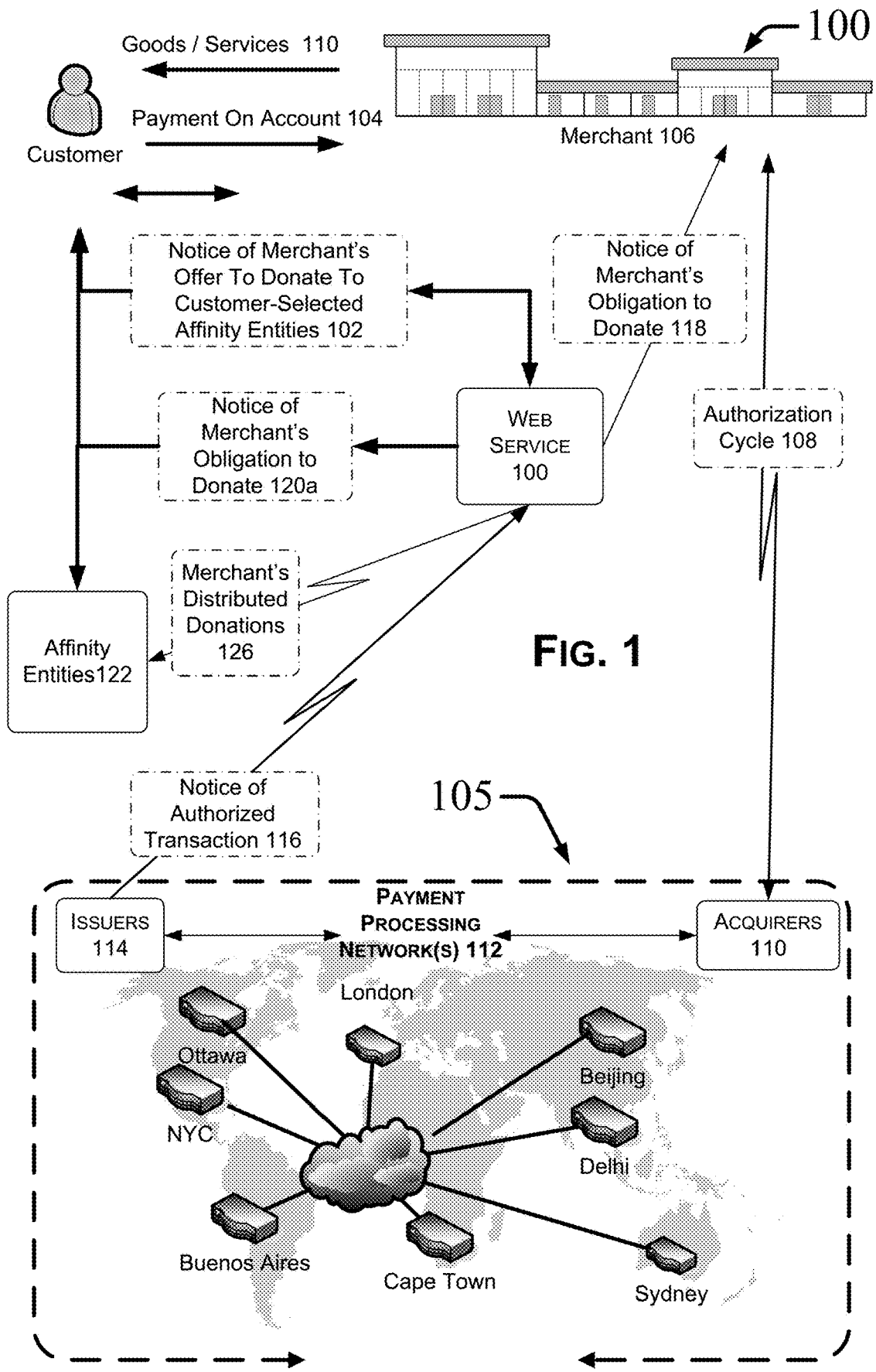
FIGS. 1-2 are flowcharts illustrating respective exemplary processes that allow an account holder to conduct a transaction to purchase of goods and/or services from a merchant, where the account holder is given an incentive to conduct the transaction with the merchant, and where such an incentive can be the merchant's obligation to make a donation to an affinity entity (e.g., a charity) designated by the account holder (e.g., the consumer).

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Implementations provide a system, data access management utility and a method of whereby a local merchant, who conducted a brick and mortar transaction with a local customer, can provide an incentive to the local customer, who had not previously conducted a transaction with the local merchant, to view an online advertisement of the local merchant.

Implementations may track customer transactions, including both online and offline transactions. Implementations may collect data about customers, either expressly, or from offline or online transactions, and the data may be stored in a data storage area. All data in the data storage area may be accessed by a data mining tool, and a transaction linking utility. Matches between the brick and mortar transactions of local merchants with local customers may be identified by the transaction linking utility, and a level of certainty can be determined as to whether a customer in a matching brick and mortar transaction with a merchant had previously conducted a transaction with the local merchant. If the level of certainty is determined such that the local customer was unlikely to have previously conducted a transaction with the local merchant, then a unique link is sent to a logical address of the local customer. Access to an incentive is provided when the local customer follows the unique link. As a result of the foregoing, a measured result can be provided to the local merchant as to those local customers who received and followed the unique link after having conducted a first time brick and mortar transaction with the local merchant and then who subsequently went online by following the unique link. In an alternative to the foregoing implementation, an incentive may only be provided to the consumer if, based on an examination and review of the consumer's web usage data, it had been determined that the consumer had not previously viewed online content for the merchant. Stated otherwise, if the examination and review of the consumer's web usage data showed that the offline transaction was not a result of the consumer having viewed the merchant's website, then no incentive would be provided to the customer.

Implementations may involve the internet, an intranet or other networked environment. Therefore, any reference to any of Internet, intranet or other networked environment should be understood broadly to encompass not only the referenced term, but all of Internet, intranet or other networked environment. In the same manner terms indicating aspects of either the Internet, an intranet or another networked environment, such as a webpage in an Internet environment, should be understood broadly to include the equivalent available in the Internet, intranet or other networked environment.

Overview

In one implementation a system administrator of a marketing system may facilitate the collection of information for storage in a data storage source, such as a database. Merchants, members and other groups or individuals may become participants in the marketing system. Each participant may have a participant identifier. Upon joining the marketing system, or after joining, the participants may provide information regarding themselves, including the location of the participant (e.g., a merchant's store(s) location(s), a customer's home and/or work address, etc.) to the marketing system. The marketing system may store the information as data in the storage area.

The data in the storage area may be mined by a data mining tool. The data mining tool may be utilized by any participant of the marketing system. For example, the participant merchant may devise a merchant incentive, such as a discount, a donation to a local charity, a giveaway, a sweepstakes entry, rewards (such as reward points) or any other incentive. Access by the local customer to the incentive is provided when the local customer follows the unique link sent to the logical address of the local customer.

The data mining tool may also be utilized to identify members of the marketing system who are identified as existing near the participant merchant store location. For example, the data mining tool may identify participant members living and/or working in the area of the merchant store location and/or one or more community programs, in accordance with member profile information and other data stored in the data storage area and any linked data sources. The data mining tool may also be utilized to identify participant members who may be likely to visit the merchant store and/or make use of the incentive, in accordance with demographic information or preferences derived from data stored in the data storage area and any linked data sources. A skilled reader will recognize that other information regarding a member, for example, such as transactional behavior, may also be utilized to identify participant members who may be likely to visit the merchant store and make use of the incentive. In particular, techniques for determining which local customers are in close proximity to the local merchants such that they are likely to visit the merchant store and/or make use of the incentive, are disclosed and enabled in U.S. patent application Ser. No. 13/748,459 filed on Jan. 23, 2013, titled "Authorized Transaction Incented By Merchant Donation," which is incorporated herein by reference.

In one implementation, a local customer having a device with a logical address may receive a communication containing a unique link. Such a communication will have been sent to the device of the local customer member if the local customer conducted an in-person, brick and mortar transaction with a local merchant, where the local customer had not previously conducted a transaction with the local merchant. The unique link in the communication, if followed by the local customer, may allow the customer to view a display of incentives from the local merchant on a webpage of the local merchant. The display may be immediately presented after the local customer follows the unique link in the communication (e.g., the local customer uses a browser to click on the uniform resource locator (URL) which is the link that is unique to the local customer).

Transaction details may be transferred to the marketing system for storage and mining by a variety of means and at a variety of times. For example, transaction details may be transferred to the marketing system in real-time (e.g., as a transaction occurs and concludes), near real-time (e.g., almost immediately after a transaction concludes), and/or after a time lapse (e.g., at the end of a time period, such as a set time(s) during a day, at the end of the day, at the end of a week, at month-end, or at any other time after a transaction is finished, information regarding one or more transactions may be provided to the marketing system). The data mining tool may be utilized to collect data from the storage area, and possibly other data sources, to generate specific information, for example, such as information regarding consumer behavior data that may provide: one or more reports pertaining to a particular incentive (e.g., success of an incentive); information to be utilized to create a new incentive; suggestions of new incentives; or other information.

In particular, the data mining tool may be utilized to determine if a brick and mortar transaction (e.g., other than an 'card not present' transaction) was conducted by a local customer with a local merchant with whom the local customer was unlikely to have previously conducted a transaction. If so, then the data mining tool will suggest that the local merchant direct that an incentive to be sent to the local customer, where the incentive is for the local customer to conduct a transaction with the local merchant. For example, the data mining tool may be engaged (and optionally the analytic mode may also be engaged) to recognize particular pre-transaction behavior by a local customer characterized by not having previously conducted a transaction with the local merchant. In particular, techniques for determining if a brick and mortar transaction (e.g., other than an 'card not present' transaction) was conducted by a local customer with a local merchant, are disclosed and enabled in US Patent Application Publication No. 20150142544, titles "Systems And Method For Incenting Consumers", Ser. No. 14/408, 199, which is incorporated herein by reference.

Such pre-transaction behavior, if determined with a level of certainty above a predetermined threshold, will be followed by a unique link being sent to a logical address of the local customer. The unique link, if followed, will provide one or more incentives to the local customer. Alternatively, additional incentives may be available to the local customer if and when the local customer conducts an online transaction with the local merchant. Note that the pre-transaction behavior of the local customer may be limited to a particular period of time, such as not to exceed thirty (30) calendar days. Such data may be utilized by the marketing system, merchant, and/or other participants to make determinations about future incentives to other similarly situated local customers, gauging the success of past incentives, marketing strategies, and other decisions.

Embodiments of various implementations may include a transaction linking utility to access the data in the data storage area or data extracted or analyzed by the data mining tool and the analytic mode, and to utilize this data to identify links between a transaction conducted between a local merchant and a local customer. For example, the transaction linking utility may analyze the data to recognize the existence of links or matches between transactions and other behavior or activities of local customers. As such, the transaction linking utility may be operable to identify a match between a brick and mortar transaction with a local merchant by a local customer who had not previously conducted a transaction with the local merchant, and the local customer following the unique link sent to the local customer. The transaction linking utility may also be operable to identify a match between the brick and mortar transaction and a later online transaction when the local customer conducts an online transaction with the local merchant after having followed a unique link in a communication that had been sent to the local customer as an incentive. The transaction linking utility may further determine a likelihood or level of certainty that a transaction resulted from the local customer having been sent the incentive in the communication to their corresponding logical address. A skilled reader will recognize that the transaction linking utility may utilize a wide variety of data to undertake its function and may link a transaction to a wide variety of behaviors or activities by a member, and may determine the link to be of varying degrees of likelihood or certainty. The transaction linking facility may also involve data such as member profile data, including a member's financial card information, or a member's identification, to determine a link between a member and a transaction.

In one implementation, data, or other information, may be transferred regarding a member or other participant from a separate data source, such as a data base, to the marketing system. For example, a member may be a financial card holder, and all financial card holders may be given the option to become members of the marketing program. The financial card company may also become an intermediary of the marketing system. Once a financial card holder agrees to become a member of the marketing system, information and other data regarding the financial card holder, as gathered by the financial card company, may be either transferred to the marketing system, or may be made accessible by the marketing system.

A skilled reader will recognize that other groups may become members, such as, for example store card holders, members of a community group, such as a co-op, bank card holders, or any other group, and that the persons involved in the group may become members of the marketing system. The group may gather information independently from the marketing system and this information regarding persons who become members of the marketing system may be made available to the marketing system via a transfer, or via access to the data source of the group.

The persons involved in the group may be granted an identification, such as a numeric identification. This identification may be acknowledged by the marketing system, so that when a person involved in the group becomes a member of the marketing system, the marketing system stores the identification provided by the group. The identification may be stored in the marketing system as the participant identifier. In some embodiments of various implementations more than one participant identifier may be stored in the marketing system for a member, or a participant identifier may be stored, and other identifications may also be stored. Any transaction that occurs and utilizes the identification may be recognized by the marketing system as a transaction involving the member whom the identification represents.

For example, a financial card holder may be granted a financial card number. The financial card holder may become a member of the marketing system. Upon becoming a member of the marketing system the financial card number of the member may be transferred, or otherwise provided, to the marketing system. The marketing system may utilize the financial card number as an identification for the member.

The one or more identifications, or one or more participant identifiers, identified as pertaining to a member of the marketing system may be utilized by the member during a transaction. For example, a member may utilize a financial card during the transaction and the financial card number may be an identification, or participant identifier, identified as pertaining to the member by the marketing system. The marketing system may therefore recognize that the transaction involves the member due to the use of the financial card number. A skilled reader will recognize that other identifications, or participant identifiers, may be utilized by a member, that such identifications may be stored by the marketing system, and that use of an identification, or participant identifier, during a transaction may provide a means of identifying a transaction as involving a particular member. As described above, the identification may be stored as a participant identifier by the marketing system.

In still other computer-network implemented methods, a promotion for one or more merchants of a marketing program is made to one or more members of the marketing program. Each of the one or more merchants has a corresponding merchant profile that includes a geographical location and each member has a corresponding member profile that includes a geographical location. Each member profile and each merchant profile are stored on a data storage device. Each member profile includes a participant identifier for the corresponding member. In each such method there is a detection made of an occurrence of a transaction associated with a merchant of the one or more merchants. Data is received or accessed, where the data is associated with the transaction. A determination is made with respect to a participant identifier of the one or more members from the data associated with the transaction and a determination is made of the merchant with whom the transaction was conducted. A determination is made as to a level of certainty whether the transaction was the first between the merchant and the member with the participant identifier. Based on the determined level of certainty, one or more incentives are generated for the member with the participant identifier. The one or more incentives are accessible via a URL unique to the member with the participant identifier. The URL is sent to a logical address corresponding to the one or more members with the participant identifier. Thereafter, there is a monitoring, receiving, and storing in the data storage device, of electronic signals representing data related to online user activity of the one or more members to detect the online user activity of the member with the participant identifier. As a result of detecting detect the online user activity of the member with the participant identifier, a determination is made as to whether the member with the participant identifier followed the URL.

To find out whether or not a local customer conducted the transaction with the local merchant in-person, such as via a brick-and-mortar transaction, a determination is made as to a level of certainty whether the transaction was conducted in-person by the member with the participant identifier, whether an account issued to the member with the participant identifier was used to pay the merchant for the transaction, or whether the transaction was not a "card not present" transaction. It can also be determined whether the member with the participant identifier paid the merchant in cash for the transaction rather than via a debit account or a credit account, because various implementations also allow incentives from local merchants to be directed to local customers who transact in cash. Implementations that provide incentives from local merchants to be directed to local customers who transact in cash are further disclosed in United States Patent Application Publication No. 20150302447, Titled "Systems, Methods And Devices For Non-Acquired Account Payment Affinity Donation", Ser. No. 14/646,235, which is incorporated herein by reference.

A level of certainty can be determined as to whether the respective geographical locations of the merchant and the member with the participant identifier are in the same vicinity, where, in various implementations, incentives are given to local customers only if there travel time to the local merchant is below a predetermined threshold.

In some implementations, the local merchant will make a donation to a local charity only after it has been determined with a level of certainty above a predetermined threshold that the local customer to whom the unique URL was sent follows the URL (e.g., clicks on the URL). In such cases of determined high certainty, a post-transaction communication will be sent to the local address corresponding to the local customer. The contents of such a communication can be: (i) a summary of the transaction between the local customer and the local merchant; (ii) the value of a donation made by the local merchant to the local charity because the local customer followed the unique URL; (iii) a total of all donations by all local merchants to all local charities due to the member having conducted transactions with the merchants; (iv) a confirmation corresponding to one or more prize entries for the local customer because the local customer followed the unique URL; (v) a summary of current said prize entries for the member with the participant identifier; (vi) details of available prize entries for the local customer; (vii) a confirmation of one or more incentives available for and/or received by the local customer, where each incentive is one or more of an offer to the local customer from the local merchant to: (a) have a discount on a future said transaction with the merchant; (b) receive an entry to a sweepstake contest; and (c) that the merchant will make an additional said donation to an additional said affinity entity; and (viii) a survey, accessible by following a survey-URL, requesting a review of the local customer's experience with the local merchant.

In some implementations, if the level of certainty that the respective geographical locations of the local merchant and the local customer are in the same vicinity exceeds a predetermined threshold, a business rule is triggered by which the merchant will make a donation to a local charity having a physical presence in the same vicinity. The local vicinity may be defined by the travel time from the residence of the local customer to the brick-and-mortar store of the local merchant. As such, the incentive of the merchant's donation to the local charity is only offered to local customer who are deemed to be close enough to the local merchant so as to be likely to be conduct future transactions with the local merchant.

In still other implementations, there is a monitoring, receiving, and storing in a data storage device, of electronic signals representing data related to a first type of online user activity of a set of local customers, wherein the first type of the online user activity includes each local customer to whom: (i) a URL unique to the local customer had not been sent to a logical address corresponding to the local customer, where one or more incentives are from a particular local merchant and are accessible via the URL to the local customer; or (ii) where the URL had been previously sent but had not been followed by the local customer. For each local customer in the set, there will be generated one or more incentives from the particular local merchant for the local customer to conduct one or more additional transactions with particular local merchant, where the one or more incentives are accessible via another URL unique to the local customer. Thereafter, a communication of the 'another URL' will be sent to a logical address corresponding to the local customer.

After the 'another URL' is sent to the local customer, there is a monitoring, receiving, and storing in the data storage device, electronic signals representing data related to a second type of online user activity of the local customers to detect the second type of online user activity of the local customers, where the second type of the online user activity includes each local customer who followed the 'another URL'.

If it is determined, with a level of certainty exceeding a predetermined threshold that a local customer followed the 'another URL' that they had been sent, then: (i) a business rule may be triggered such that the corresponding local merchant will be obligated to make a donation to a local charity; and/or (ii) the local customer will be sent a post-transaction communication the contents of which may be to obtain a point of view or assessment from the local customer. By way of example, and not by way of limitation, the post-transaction communication may include: (i) a summary of the transaction between the local customer and the local merchant; (ii) the value of the donation by the merchant to the local charity; (iii) a total of all donations by all local merchants to all local charities due to the local customer having conducted the transactions the local merchants; (iv) a confirmation corresponding to one or more prize entries for the local customer, where the one or more prize entries were generated due to the transactions conducted by the local customer with the local merchants; (v) a summary of current prize entries for the local customer; (vi) details of available prize entries for the local customer; (vii) a confirmation of one or more incentives available for and/or received by the local customer, where each incentive is one or more of an offer to the local customer from the local merchant to: (a) have a discount on a future transactions with the merchant; (b) receive an entry to a sweepstake contest; and (c) that the local merchant will make an additional donation to additional local charities; and (viii) a survey requesting a review of the local customer's experience with the local merchant.

In some implementations, a local merchant will make a donation to a local charity only if the travel time of the local customer to the local store of the local is determined to be less than a predetermined threshold. These implementation ensure that the incentive to local customers that the local merchant will make a donation to a local charity will only be given to customers who reside 'close' to the merchant, thus ensuring that local merchants will support local charities only if local customers support local merchants.

Figure 2:
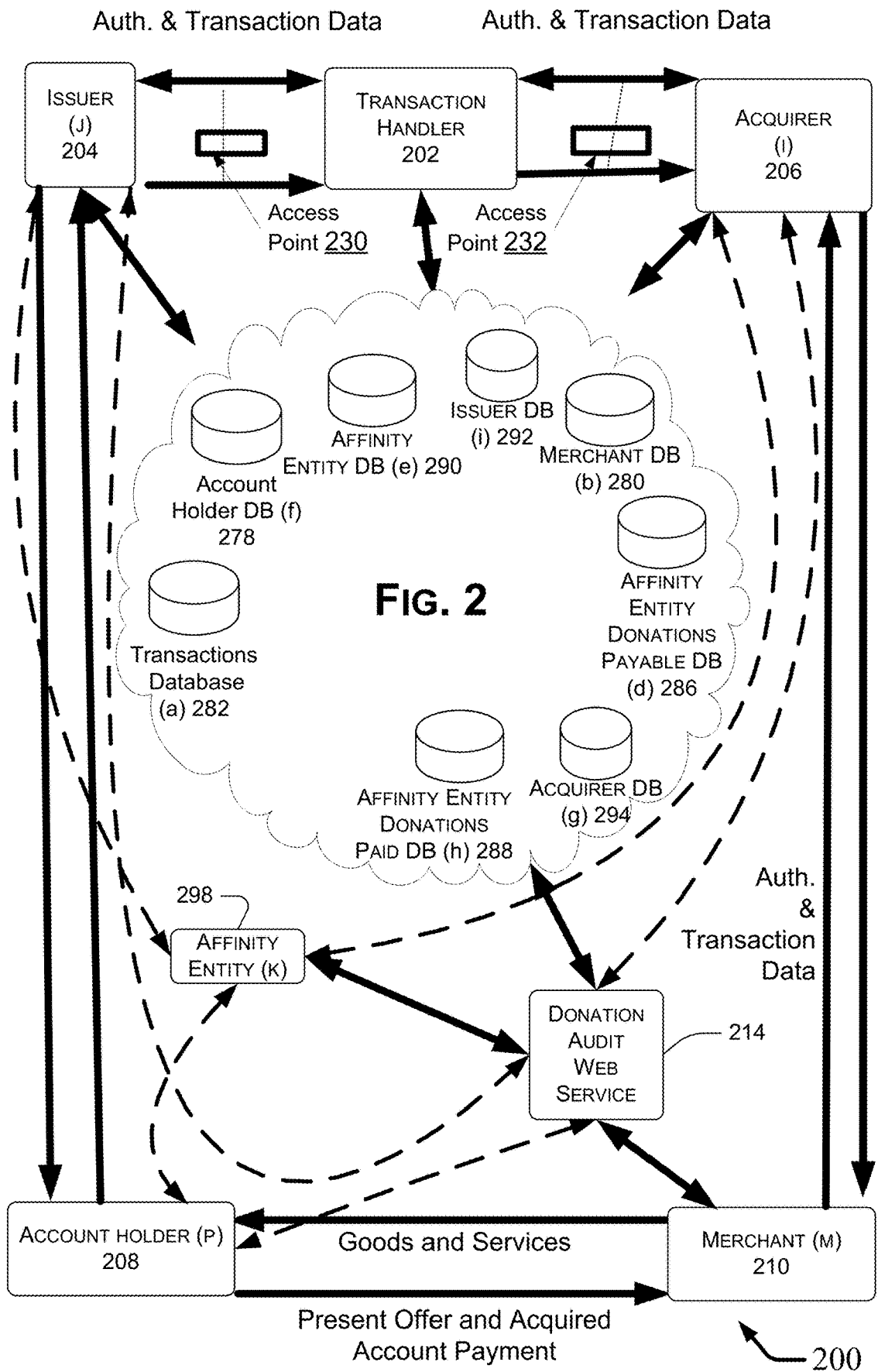

With respect to the methodologies in which a merchant incents an account holder (e.g., consumer) to conduct a transaction on an account issued to the account holder by an issuer in exchange for the merchant making a donation to entity with whom the consumer has an affinity (e.g., the consumer's favorite charity), reference is now made to FIGS. 1-2.

FIGS. 1-2 depict exemplary environments for the use of technologies disclosed in "Acquired Transactions Are Incented By Customer Directed Merchant Donations" hereinafter, the "Merchant Donor Technologies". The Merchant Donor Technologies are more particularly described in U.S. patent application Ser. No. 13/834,984, filed on Jan. 15, 2013, titled "Proximal customer transaction incented by donation of auto-boarded merchant, and in U.S. patent application Ser. No. 13/748,459 filed on Jan. 23, 2013, titled Authorized transaction incented by merchant donation, both of which are hereby incorporated by reference.

FIG. 1 shows a global Acquired Account Payment Processing System 105 in which a community resident is incentivized to transact by way of a merchant's offer 102 to a make a donation in exchange for the community resident purchasing goods and services 110 by the community resident's payment on an account 104 that was issued by an issuer 114 to the community resident. Note that, in some implementations, the merchant sets terms and conditions under which the merchant's donation will be made, while the community resident selects those affinities entities to which the merchant's donations are to be made.

The merchant, who may be operating a brick and mortar store in the community where the community resident resides, inputs data about the transaction on the community resident's account into a Point of Service terminal (POS) 106. The POS, for example, can be a cash register, a web-enabled mobile device (e.g., a tablet computing device), etc. The POS 106 transmits the input data, as part of an authorization request in an authorization cycle for the transaction, to an acquirer 110 for the merchant. Acquirer 110, who can be just one of many entities in the global Acquired Account Payment Processing System 105, sends the authorization request through a payment-processing network 112, as facilitated by one or more transaction handlers, for example Visa Net, to the issuer 112 who issued the account to the community resident. In response to the authorization request, the issuer 112 sends an authorization response at least of portion of which is ultimately sent for delivery back to the merchant's POS 106 by transmissions made in backward directions through the payment-processing network 112 via the merchant's acquirer 110.

If the transaction is authorized by issuer 114, an entity in the global Acquired Account Payment Processing System 105, such as the issuer 114, sends a message 116 containing particulars of the transaction to a Web Service 100 indicating that a transaction on the community resident's account was approved for being conducted by the community resident with the merchant whose offer to donate may have been previously selected by the community resident.

Optionally, the data input into POS 106 can include additional monies received from the customer by the merchant that are also to be donated, via the merchant, to a designated affinity entity 122 (e.g., a charity). In that case, message 116 would also contain these particulars.

Upon receipt of message 116, a donation to the affinity entity 122 by the user's selected merchant is calculated according terms and conditions specified by the merchant.

Web Service 100 retains the derived donation for subsequent audit purposes to insure compliance by each community merchant in its donation commitments to each of the one or more affinity entities or charities. The Web Service 100 may transmit a message containing notice of a donation, or the particularly derived donation, as shown at reference numerals 118-120 to respective logical addresses of the obligated merchant 106, one of more community resident/account holder designed affinity entities 122, and the community resident/account holder—and/or to respective agents thereof. The terms and conditions that obligate the merchant-offeror to make a donation may, but need not, include discounts, rebates, or other monetary or non-monetary incentives. As such, the community resident/account holder is incentivized to purchase from the merchant's store, inter alia, by the merchant's agreement to donate to one of more community resident/account holder designed affinity entities 122.

The affinity entity or charity, which may be selected at the discretion of the community resident/account holder, may be any entity to which the community resident has an affinity, regardless of where it is located or whom it serves. Alternatively, the affinity entity or charity may be limited to those organizations that provide a good and/or service to a community in which both community residences and merchants have an affinity—such as by their common geographic location, as by its geographic location being within a computed commuting time, by one more modes of transportation, that is below a predetermined time threshold. This affinity entity may provide food and clothing to underprivileged families in their common community. This affinity entity, for example, may provide teaching and demonstrations of entrepreneurial skills to community's unemployed or under employed. Another affinity entity may provide venues where sports education can be provided to local competing youth. Yet another affinity entity may provide care and feeding to abandoned domesticated animals, such as pets. The affinity entity may also cultivate desirable citizenship and public policy through offerings of education and entertainment services—whether in person, on-line, or both. Given the foregoing, the reader will understand that the affinity entity can be either a for-profit or a non-profit organization, and may optionally be required to provide a good or a service to a local community to which both merchants and customers in the same community have an affinity, by their common location, to advance and/or promote the community.

In some implementations, as disclosed in the Merchant Donor Technologies, each merchant will identify the affinity entity to whom the merchant-offer will make a donation. To identify the affinity entity, a customer identifier, as received by Web Service 100 in message 116, can be used to look up or access information from which can be derived a geographic address in a community where the customer resides. Alternatively, the customer's geographic address can be an address that is associated with an account issued by an issuer to the customer upon which the transaction with the merchant is being conducted. As a still further alternative, the customer's geographic address can be an address specified by the customer as being the address that is to be used for the purpose of determining the customer's community, whereby the customer can self-select their own community by specifying a geographic address in the customer's self-selected community. Similarly, a merchant identifier, also received by Web Service 100 in message 116, can be used to look up or access information from which can be derived a geographic address in a community where the merchant-offer has a brick and mortar store. Alternatively, the merchant's geographic address can be an address that is associated with a merchant acquirer account issued by the merchant's acquirer to the merchant that will receive proceeds from the transaction with the customer that is being conducted. As a still further alternative, the merchant's geographic address can be an address specified by the merchant as being the address that is to be used for the purpose of determining the merchant's community, whereby the merchant can self-select its own community by specifying a geographic address in the merchant's self-selected community. These respective geographic addresses of customer and merchant, whether self-selected or otherwise, when retrieved from one or more network accessible databases, can be compared, using processes, procedures, and methodologies enabled herein, by Web Service 100, from information in or derived from message 116, to determine whether the merchant and its customer have the same local community. By way of example, data in message 116 can include an identifier for the customer, and a database of merchants and their respective merchant-offers can include geographic location information. This geographic location information is matched against the geographic location information for the residence of the customer. Merchant and customer identifiers can be assigned to the merchant and its customer during or prior to any transaction, such as when each are registered with or otherwise sign up for participation with Web Service 100. This registration process can include the collection of physical and logical addresses for each or for their respective agents.

Once physical address information for the merchant-offeror and its customer are known, the local community of each of the merchant and its customer can be determined—in some implementations. Studies show that a significant portion of spending by a consumer is restricted to a region that is proximal to where the consumer resides. Accordingly, it is desirable for a merchant to attract those consumers who reside within the restricted region corresponding to the merchant's geographic location so that the customer can use a mode of transportation to travel from a geographic address of the customer's residence to the merchant's geographic location within a travel time that less than a threshold. As such, any such travel time that is less than the threshold might be understood to mean that the merchant-offeror and the customer who is traveling to the merchant-offeror are in the considered to be within the same community or the 'Merchant-Community'.

Alternatively, the local community determination can be made on any of other different methods, or combinations thereof. Once such method is a political or legal division, that is, the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same, or within a predetermined proximity, as that of its customer's residence.

Yet another such comparison can be whether the merchant's place of business and its customer's residence are physically proximate within a predetermined factor by any of a variety of measures or combinations thereof. For example, latitude and longitude coordinates might be known for both the merchant's place of business and the residence of its customer. These coordinates can be used to determine whether the linear distance there between is within a predetermined distance to ascertain whether or not the merchant and its customer share the same local community.

A calculated navigation time algorithm, using any of various different travel methods (e.g., walking, automobile, bicycle, mass transit, etc.), can be used to determine whether the time, using any of one or more modes of transportation, is within a predetermined time limit to ascertain whether or not the merchant and its customer share the same local community, 'neighborhood', or Merchant-Community. By way of example, the merchant and its customer might be determined to be within the same local community if the automobile drive time, as determined from one or more databases of contemporary cartographic road system information, to navigate from a geographic address attributed to the attributed to the customer and a geographic address attributed to the merchant is less than a predetermined time threshold (e.g., 17 minutes), with yet another threshold that may be used to weight the navigation time calculations with real time traffic conditions data.

A further alternative implementation will identify the population density of both the merchant's brick and mortar store and the customer's residence. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes). Such implementations may also access databases to consider real time traffic conditions. Rural, industrial, city, and suburban environments will have different population densities, and likely modes of transportation, that correspondingly may have an effect on a travel time from a customer's resident to a merchant's geographic location. A merchant may provide an incentive to customers living close by in exchange for traveling to, and transacting at, a merchant's store.

Still another such comparison can be whether the merchant's place of business and its customer's residence are proximate or are the same according to voting, electoral, or political districts. The district can be determined by an official method, an unofficial method, or a combination of methods. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owned and leased properties, etc. Given the foregoing, an algorithm might find that the merchant and its customer are members of the same community, not members of the same community, or are both members of more than one of the same communities as determined by the algorithm.

Similar or different algorithms that are used to determine the respective local community of the merchant and its customer can also be used to determine the local community of an affinity entity such as that shown on FIG. 1 at reference numeral 122, or as that shown as an Affinity Entity (k) 298 in FIG. 2, as discussed herein below.

In some implementations, if the local community of the merchant, its customer, and an affinity entity that has been selected by the customer or by other methods are the same, then the business rule selected by the merchant will determine the amount of the donation that the merchant will make to the selected affinity entity. In some implementations, the affinity entity to whom a merchant is to make a donation can only be selected by the customer, and not the merchant. In such implementations, the goals or purposes of an affinity entity will not cause tension between the goals or purposes of the merchant or the goals or purposes of customer in that the identity of the affinity entity is unknown to the merchant through its being selected anonymously by the customer. As such, the merchant need not be told or be given any notice, directly or indirectly, as to the identity of the affinity, entity or charity selected the customer with whom the merchant is conducting a transaction. Rather, the merchant might only be told or be given notice to make a single payment of, or period payments to, a single affinity entity who, as trustee or agent, will thereafter make respective disbursements for all registered merchants accordingly to those affinity entities that had been selected by those customers with whom those merchants had conducted transactions.

Various implementations can ensure that a merchant who, by force of reason or conscience, does not want to make a donation to a particular affinity entity or charity, need not do so directly, as any and all merchant donations are made blindly through other avenues or collection points that make all merchant donation disbursements to all affinity entities or charities. Accordingly, each merchant will have notice of its total periodic donations without knowing the identity of the intended recipients, thereby leaving the direction of donations fully within the discretion of the merchants' customers. Note that a limitation can optionally be placed upon the customer's choice of affinity entity or charity such that the choice must be made only among those affinity entities or charities that serve the local community of the merchant, its customer, or both. Such implementations may leave the currency amount of the merchant's donation fully within the discretion of the merchant. Yet another limitation can optionally be placed upon the customer's choice of affinity entity or charity such that the choice must be made only among those affinity entities or charities that are on a pre-designated list of those organizations that are pre-approved by a third party as being available for such selection according to an approval process.

Web Service 100 can use respective identifiers for the merchant and its customer (e.g., account holder) to access and retrieve geographic information for each, and then apply an algorithm to the retrieved geographic information to determine the respective local communities of the merchant and its customer, as discussed above. By way of example, the local community can be progressively granular in nature, such as: 1st the United States of America; 2nd the state of New York; 3rd the portion of New York called "Long Island"; 4th the county of Nassau within the state of New York; 5th a portion of the Nassau County called North Hempstead; and then 6th the specific geographic location of "Port Washington". This final level of geographic granularity indicates a community in which both merchant and customer are members, neighbors, residents, and/or the like.

The final level of geographic granularity can be used to perform a look-up against one or more databases to which Web Service 100 has access. This access and lookup is used by Web Service 100 to identify: (i) the affinity entity or charity for that community which, in this example, might be the Port Washington Food Bank located in Port Washington, New York, which charity might have been specified by the customer; and (ii) the respective identifier of the merchant's business rule (and/or the customer's business rule) that is to be used to make a calculation of the currency amount of the donation that the merchant is to make to the affinity entity or charity for that community. Business rule(s) is/are used with the currency amount of the customer's payment in order to calculate the currency amount of the donation that is to be made by the merchant to the affinity entity or charity for that community. Note that the donation can be directed to a plurality of affinity entities for the local community according to directions that had been previously specified by the customer. For example, the customer may have specified that each merchant donation is to be split evenly, or in specified portions totaling one hundred percent (100%), between five (5) local community affinity entities, for example: (i) a local youth sports team cooperative; (ii) a local charter junior high school; (iii) a local house of worship; (iv) a local political party; and (v) a local for-profit college specializing business entrepreneurialism.

Referring now to FIG. 1, the community resident can take the merchant's conditional offer 102 to the local merchant's brick and mortar store POS 106. After showing the offer 102 to the merchant at the POS 106, the community resident conducts a transaction on an account 104 issued by an issuer to the community resident to pay of the transaction and buy goods and/or services 110 received by the community resident.

Note that terms and conditions of the transaction may differ from that of the offer presented by the community resident at the local merchant's brick and mortar store. As such, the merchant's offer to donate might not be specific to a particular good or service, but can be specific as to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or only if the currency amount of the transaction exceeds a predetermined amount, or a combination of the foregoing. Other conditions are also permissible.

Although some terms of the offer may differ from some terms of subsequent transactions between the merchant and its customer, nevertheless, the merchant's offer to make a donation to an affinity entity (e.g., a local charity) fundamentally provides an incentive that causes, at least in part, the local community resident to navigate to the local merchant's brick and mortar store, come into the store, shop, and ultimately conduct a transaction that will bring revenue to the local merchant and its community. Advantageously, the absence of specificity in the offer as to a particular good or service allows many implementations to operate without modification to the merchant's input of data about the transaction at the POS 106, without modifications to the POS 106 itself or procedures for its operation, and without modifications to software executing on POS 106.

Optionally, a community resident (e.g., customer) may accept the merchant's offer 102 in advance of going to the POS 106. Such advance acceptance may take place electronically, such as in response to the community resident's electronic receipt of offer 102. Such an electronic acceptance to offer 102 can be by way of a transmission of information from the community resident to the merchant. The transmitted information can include: (i) an identifier for the registered customer who intends to accept the merchant's offer 102; (ii) the calculated distance and/or time for the customer to navigate, using a known mode of transportation, from a geographic location associated with the customer (e.g., home location, work location, vacation location, etc.) to the merchant's brick and mortar store of the POS 106, for instance, by walking, bicycling, automobile and/or mass transit; (iii) the terms and conditions of the offer including any expiration thereof; (iv) optionally any other information already conveyed to the customer, such as a statement about the donation that the merchant will make to the Affinity Entity(ies) 122 when the customer conducts a timely transaction with merchant; and (v) other unexpired offers or advertisements that may or may not have been conveyed to the customer, terms and conditions of such other offer(s), etc.

Referring now to FIG. 2, an exemplary process 200 is depicted of a particular financial transaction system, such as may be described as an open loop system, in which an account holder (p) 208 conducts a financial transaction with a Merchant (m) 210. By way of example, the Account Holder (p) 208's financial transaction with the Merchant (m) 210 may have been incentivized by the Merchant (m) 210's agreement to make a donation to an Affinity Entity (k) 295 in the local community as defined by the Merchant (m) 210 through an ad incentive which, optionally, can be communicated to Account Holder (p) 208, whether requested or not.

In FIG. 2, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 204-210 and 278-294, and 298 in FIG. 2 are illustrated with a block, but indicate one or more elements can be present. For example, Issuer (j) 204 is one of a possible plurality of issuers, where j may range from 1 to a large integer T.

Account Holder (p) 208 presents an account bearing payment device to a Merchant (m) 210 as tender for a financial transaction such as a purchase of goods and services. As part of the transaction, the Account Holder (p)'s 208 payment device can be a credit card, debit card, prepaid card, cellular telephone, Personal Digital Assistant (PDA), etc. Those of skill in the art will recognize that other financial transactions and instruments other than credit cards may also be used, including, but not limited to, a prepaid card, a gift card, a debit card, a token equivalent of an account as communicated via cellular telephony, near field communications, and the like. For purposes of illustration and explanation, however, reference will be made to a credit card.

The payment device can be manually keyed into a POS or can be read by a reader operated by the Merchant (m) 210, whereupon account information is read from the payment device and a request for authorization is transmitted to the Merchant (m) 210's Acquirer (i) 206. Each Acquirer (i) 206 is a financial organization that processes credit card transactions for businesses, for example merchants, and is licensed as a member of a Transaction Handler 202 such as a credit card association (i.e., Visa Inc., MasterCard, etc.) As such, each Acquirer (i) 206 establishes a financial relationship with one or more Merchants (n) 210.

The Acquirer (i) 206 transmits the account information to the Transaction Handler 202, who in turn routes the authorization request to the account holder's issuing bank, or Issuer (j) 204. The Issuer (j) 204 returns information via an authorization response to the Transaction Handler 202 who returns the information to the Merchant (m) 210 through the Acquirer (i) 206. The Merchant (m) 210, now knowing whether the Account Holder (p) 208's credit card account is valid and supports a sufficient credit balance, may complete the transaction and the Account holder (p) 208 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (m) 210 to Acquirer (i) 206, who in turn routes the transaction data to the Transaction Handler 202 who then provides the transaction data to the appropriate Issuer (j) 204. The Issuer (j) 204 then provides funding for the transaction to the Transaction Handler 202 through a settlement bank. The funds are then forwarded to the Merchant's (n) 210 Acquirer (i) 206 who in turn pays the Merchant (m) 210 for the transaction less a merchant discount, if applicable. The Issuer (j) 204 then bills the Account holder (p) 208, and the Account holder (p) 208 pays the Issuer 204 with possible interest or fees.

Also shown in FIG. 2 are one or more Affinity Entities (k) 298 and a Donation Audit Web Service 214 that implement processes by which donations to the one or more Affinity Entities (k) 298 from various donors, for instance, any Issuer (j) 204, a Merchant (m) 210, any Acquirer (i) 206, and the Transaction Handler 202. Donation Audit Web Service 214 implements processes for the auditing of donations to the one or more Affinity Entities (k) 298. The Donation Audit Web Service 214 has access to information resources within the following databases: Account Holder databases 278; Merchant databases 280; Transaction databases 282; Affinity Entity Donations Payable databases 286; Affinity Entity Donations Paid databases 288; Affinity Entity databases 290, Issuer Bank databases 292, and Acquirer Bank databases 294.

As shown in FIG. 2, Databases 278-294 can be connected by one or more private or public networks, virtual private networks, the Internet, or by other means known to those skilled in the art. Moreover, not every entity seen in FIG. 2 at reference numerals 208, 210, 214 and 298 must necessarily have real time, uninterrupted access to any or all of the Databases 278-294. Each such Database 278-294 can assign, read, write, and query permissions as appropriate to the various entities. For example, a Merchant (m) 210 may have read access to the one or more Transactions Databases 282.

Each Transactions Database (a) 282 can be designed to store some or all of the transaction data originating at the Merchants (n) 210 that use a payment device for each transaction conducted between an Account holder (p) 208 and the Merchant (m) 210. The transaction data can include information associated with the account of an Account holder (p) 208, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 282 is also designed to store information about each Merchant (m) 210, where the information can include a unique identification of each Merchant (m) 210, an identifier for each point of sale device in use by the Merchant (m) 210, and a physical geographic location of each store of the Merchant (m) 210.

Also included in the Transactions Database (a) 282 is account information for payment devices associated with Account holder (p) 208, such as part or all of an account number, unique encryption key, account information, and account name of an account holder who is registered to participate in a system in which donations can be made to each Affinity Entity (k) 298 as per rules stored in Merchant Database (b) 280. After registering to participate in the donation system, an Account holder (p) 208 initiates a qualifying purchase transaction with a Merchant (m) 210 by presenting a payment device (not shown) to the Merchant (m) 210. The payment device is typically presented at the Point Of Service terminal (POS) at which data thereon is read. Certain transaction information is transmitted from the POS (e.g., card track data) in route to the Merchant's (n) 210 Acquirer (i) 206. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 210, and the ultimate destination, such as the Acquirer (i) 206. These points can include, without limitation, from the reader at the POS, the POS at the Merchant (m) 210 and a network router or computer that is connected to a network but is housed and maintained by the Merchant (m) 210 and between the Merchant (m) 210 and the Acquirer (i) 206. The communication channel could be Ethernet, wireless internet, satellite, infrared transmission, or other known communication protocols. Some or all of the transmission may also be stored for record keeping, archival or data mining purposes with little or no encryption. For example, the Merchant (m) 210 may store transaction data, including certain account information in the Merchant's (n) 210 accounts on file database for reuse later.

During a transaction conducted by Merchant (m) 206 on an account issued by Issuer (j) 204 to Account Holder (p) 208, information relating to the qualifying purchase is retrieved from the POS at Merchant (m) 206. The transaction information is comprised of account information together with other information about the transaction itself: time, date, location, value, etc. Certain parts of the transaction information are considered sensitive information including, without limitation, account number, credit card verification number, and account name.

For the Account Holder (p) 208 to donate to each Affinity Entity (k) 298 as may have been previously specified, the Account Holder (p) 208's Issuer (j) 204 can pay the Affinity Entity (k) 286 and apply a debit in that currency amount on the Account Holder (p) 208's periodic revolving credit statement. The Account Holder (p) 208, upon receipt of the statement, can thereafter make a total payment to the Issuer (j) 204 of the currency amount of the donation that appears as a debit on the statement along with the other credit charges that also appear on the Account Holder (p) 208's statement.

Both the Account Holder (p) 208 and the Merchant (m) 210 can change or disable a donation commitment at any time by accessing a server that serves web pages where respective user interfaces are provided. Thus, charitable donation commitments can be enabled or disabled using near real-time user interfaces. By way of example, and not by way of limitation, such servers can be hosted by the Donation Audit Web Service 214 seen in FIG. 2.

In various implementations, Donation Audit Web Service 214 seen in FIG. 2 receives information that confirms such a timely transaction between the customer and the merchant by way of receiving information derived from an authorization response for the transaction. As more fully described elsewhere herein with respect to FIG. 2, the information in the authorization response is typically generated by an Issuer (j) 204 who issued an account to the Account Holder (p) 208 (e.g., the customer or mobile device user) on which the timely transaction with the Merchant (m) 210 was conducted. A positive authorization response reflects the Issuer (j) 204's approval of the transaction on the account issued to Account Holder (p) 208. Stated otherwise, and as shown in FIG. 2 and discussion herein below, Donation Audit Web Service 214 receives the information derived from an authorization response from an acquired account payment processing system (i.e., see Ref. Num. 105 in FIG. 1), where each of the Issuer (j) 204, the Account Holder (p) 208, and the Merchant (m) 210 operate in the acquired account payment processing system.

Once confirmation has been received by Donation Audit Web Service 214 that a timely transaction has taken place been the merchant who made the offer and the customer who selected and confirmed that offer, a calculation is made of an amount of a donation that is to be made by the merchant-offeror according to terms of the offer.

In summary, process 200 permits the Account Holder (p) 208 to transact with community Merchants 210 by way of incentives from the community Merchants 210 that they will donate to the Account Holder (p) 208's favorite charity (e.g., Affinity Entity 298), though the charity may not be the Merchant (m) 210's favorite charity, or even a desirable charity, in that community. Nevertheless, the Merchant (m) 210 has received the benefit of customers' foot traffic inside the merchant's local brick and mortar store, as well as the benefit of transactions with some of those customer who enter the merchant's brick and mortar store, where each such benefit is realized by the merchant's offer to make a donation to the customer's favorite charity(ies) if a timely transaction occurs subsequent to the merchant's offer.

Figure 3:
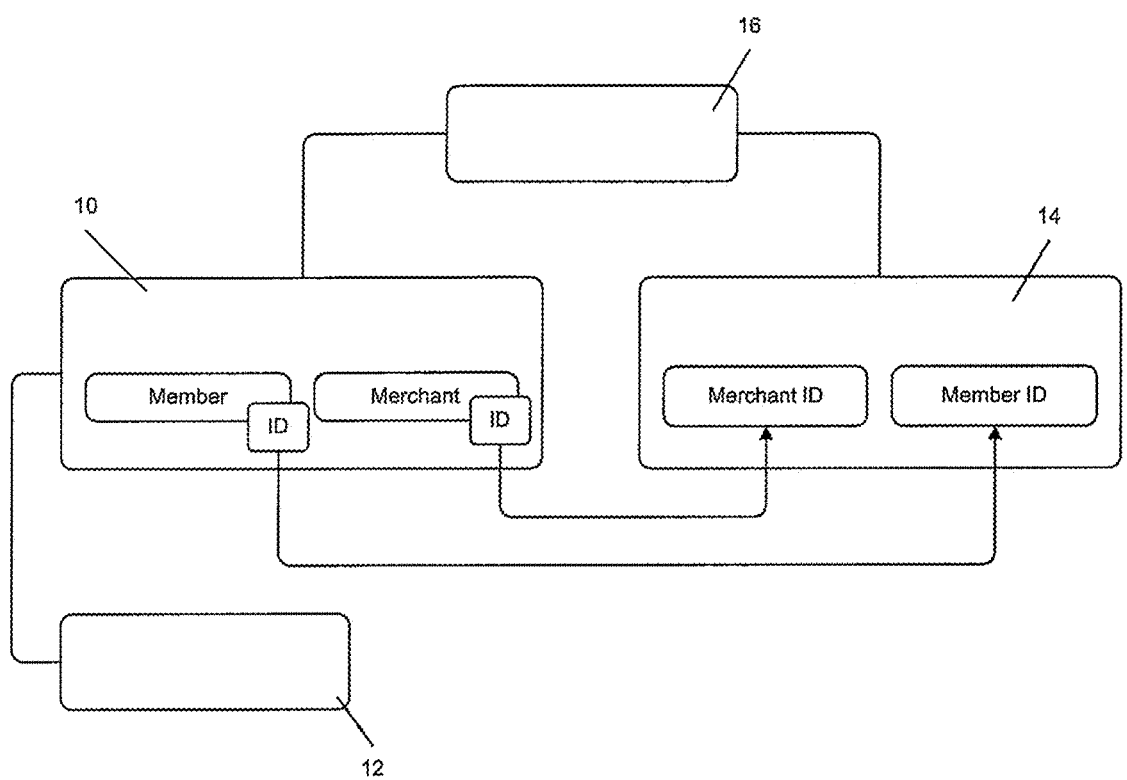
FIG. 3 is a systems view of a marketing program.

As shown in FIG. 3, a marketing system may be operable in accordance with a web-based computer program product that provides a loyalty engine 10, linked to a web server. The loyalty engine 10 may provide a marketing system interface to enable specific features, for example, such as surveys, incentive communications, data mining and other features. Transactions occurring between members and merchants, including transactions utilizing a point of sale facility 12, may be recorded or otherwise linked to data storage means. For example, a data storage means may be a database that may be included in one or more servers. As another example, a server farm may be included in the system of various implementations and one or more linked databases may be included as a data storage area. A skilled reader will recognize that Implementations may utilize a combination of stored data and real-time data (the real-time data may or may not be stored), and that both of these types of data may be utilized by the data mining tool. The data mining tool 14 may be operable by the loyalty engine, and may be utilized by members, merchants, the administrator, an intermediary, or any third party that is provided specific access to the data mining tool.

In one implementation, transaction linking utility 16 may be utilized to compare transaction details regarding a merchant and/or member with stored data, for example, such as a member or merchant profile. In this manner a transaction may be confirmed to be between a specific merchant and a specific member. Details of the transaction may be stored in the data storage area as corresponding to the merchant and/or member involved in the transaction. For example, details of the transaction may be stored in the member profile, merchant profile, as historical transaction and/or as preferences.

The transaction linking utility 16 may also be utilized to identify a specific member that may be eligible for one or more merchant incentives based upon a transaction. For example, the transaction linking utility may utilize member information to determine that the member is likely to have conducted a first transaction with the merchant, that the first transaction was conducted in-person at the merchant's brick and mortar store, and that the member is not likely to have conducted a prior transaction with the merchant. From these determination, it will further be determined that the member is not likely to be familiar with the merchant's online presence (e.g., goods and services available for purchase at the merchant's website.) After these determinations are made by the transaction linking utility 16, then the member may be eligible for an incentive which may be taken advantage of by the member.

The incentive will be communicated to the member through any of variety of means, including a communication to a mobile device (e.g., a text, twitter, etc.), an email, a mailing, or any other means. A URL will be included in the communication which, when followed by the member, will allow the member to access the incentive. The URL will be unique to the member such that only the member can use the URL to access the incentive. Alternatively, the incentive may be present to the member in another unique form, such as a QR code.

The incentive, once accessed by the member following the unique URL (e.g., the member uses a browser to click on a URL on a webpage served to the member's browser), may have many different forms, such as a sweepstake entry, a discount, a donation to a charity, rewards points, a coupon, or any other incentive form or combination of incentive forms (e.g., a donation to a charity and a discount, etc.) By way of example, any of the foregoing incentives may be accredited to the member by the data mining tool 14, the loyalty engine, and/or the transaction linking utility 16 having detected that the member followed the URL. Alternatively, any of the foregoing incentives may be accredited to the member only after a detection that the member: (i) followed the URL which served a webpage for the merchant at which the member can conduct an online transaction for goods and/or services with the merchant; and (ii) conducted an online transaction at the webpage of the merchant to purchase goods and/or services from the merchant, Implementations may involve a web-environment, or other inter-connected networked environment, wherein an operator of the marketing system can capture activities of a user to ascertain whether or not the user has clicked on the unique URL sent to the user in a communication indicative of the user was likely to have conducted a first transaction, in-person with a merchant. Stated otherwise, the user's online activities may be captured by the marketing system in order to determine whether or not the user's click activity included clicking on the incentive-bearing, unique URL that was sent to the user in a communication. In embodiments of various implementations the user online activities may occur through the use of a variety of communication devices, for example, such as a smart phone, a cell phone, a PDA, a tablet, a laptop, or other types of communication means.

Once the incentive-bearing, unique URL is sent to the user in a communication, the user may take advantage of the incentive by following the unique-to-the-user URL. In one implementation, following the URL will result in a webpage of the merchant being served to the user's browser where the user is offered an incentive of an discount on an e-commerce purchase from the merchant via the webpage of the merchant. The user may utilize the incentive and redeem it for a discount on a bike during a transaction at the merchant's webpage. Details regarding the transaction may be transferred to the marketing program. A further incentive may be triggered when the details regarding the transaction are received and processed by the marketing program. For example, the further incentive may be an incentive such as a prize entry, or a donation to a community program. Based upon the transaction details that indicate that the member acquired an incentive that is communicated to user that resulted in the user's access the webpage of the merchant, it can be assumed that the e-commerce transaction resulted from the user having been sent an incentive which was accessed by the user following the unique-to-the-user URL received in communication to the user.

After it has been determined that the user was likely to have conducted the user's e-commerce (e.g., online) transaction at the merchant's webpage, a post-transaction survey may be generated and communicated to the user if the user. The post-transaction survey may be completed by the member and the information included in the survey may be processed by the marketing program. The merchant may use user-provided information in the survey response from the user to develop effective incentive programs, to evaluate the success of incentive programs, or for other purposes.

In one implementation an analytic mode may be engaged to function in connection with the transaction linking utility to produce reports, reviews or other feedback for participants interested in identifying instances where a transaction occurred as a result of the user having been sent a unique URL to an incentive for an e-commerce transaction with a merchant at the merchant's website.

Figure 4:
FIG. 4 is a view of a merchant incentive communicated to a smart phone.

As shown in FIG. 4, an incentive, in this instance in the form of a discount on a future transaction with the merchant, is seen on a display screen that is rendered on a member's communication means 20, which may be a web-enabled mobile computing device (e.g., a smart phone). The rendered incentive is the result of the member having followed a unique URL that was sent to the member's device in a communication. The member can take advantage of the incentive at the webpage of the merchant by redeeming the incentive to obtain a discount on an e-commerce transaction at the merchant's webpage. Other than as shown in FIG. 4, communication means 20 can be a PDA, a tablet, a laptop, or other type of communication means, whereby details may be uploaded and downloaded from the loyalty engine. For example, the system may be linked to a smart phone belonging to a member, whereby incentives may be disseminated to the member via the smart phone. In this manner a coupon 22 may be disseminated to a member and communicated by the loyalty engine to the member's smart phone. The coupon may further include a bar code, a unique reward identifier, or other intelligent information.

Additionally, information entered into a communication means, such as a smart phone, may be transferred to the loyalty engine and ultimately stored in the data storage area. For example, a survey may be disseminated to a member whereby the survey is available to the member on the member's smart phone. Responses to the survey made by the member via the smart phone may be transferred to the loyalty engine and thereby stored in the data storage area. A skilled reader will recognize that data may be transferred to and from the loyalty engine, to merchants, members, intermediaries or any other third party.

Merchant Registration, Interface and Functionalities

A merchant may join the marketing program by registering. A merchant will preferably have both one or more brick and mortar locations as well as the capability of conducting online transactions with members of the marketing program. A merchant may identify the location of any bricks and mortar locations to the marketing system along with other merchant profile information. Merchant profile information may be provided to the marketing system at the time of registration as well as at points in time after the initial registration occurs.

A registration interface may be provided to the merchant via a web page, via a mobile device, or via any other means. The merchant information may include a variety of information, for example, such as a merchant participant identifier, the location of the merchant's brick and mortar, and online, store(s), the merchant's target clientele, etc. The merchant information may allow the marketing program to link a financial card or other billing system to the merchant.

Figure 5:
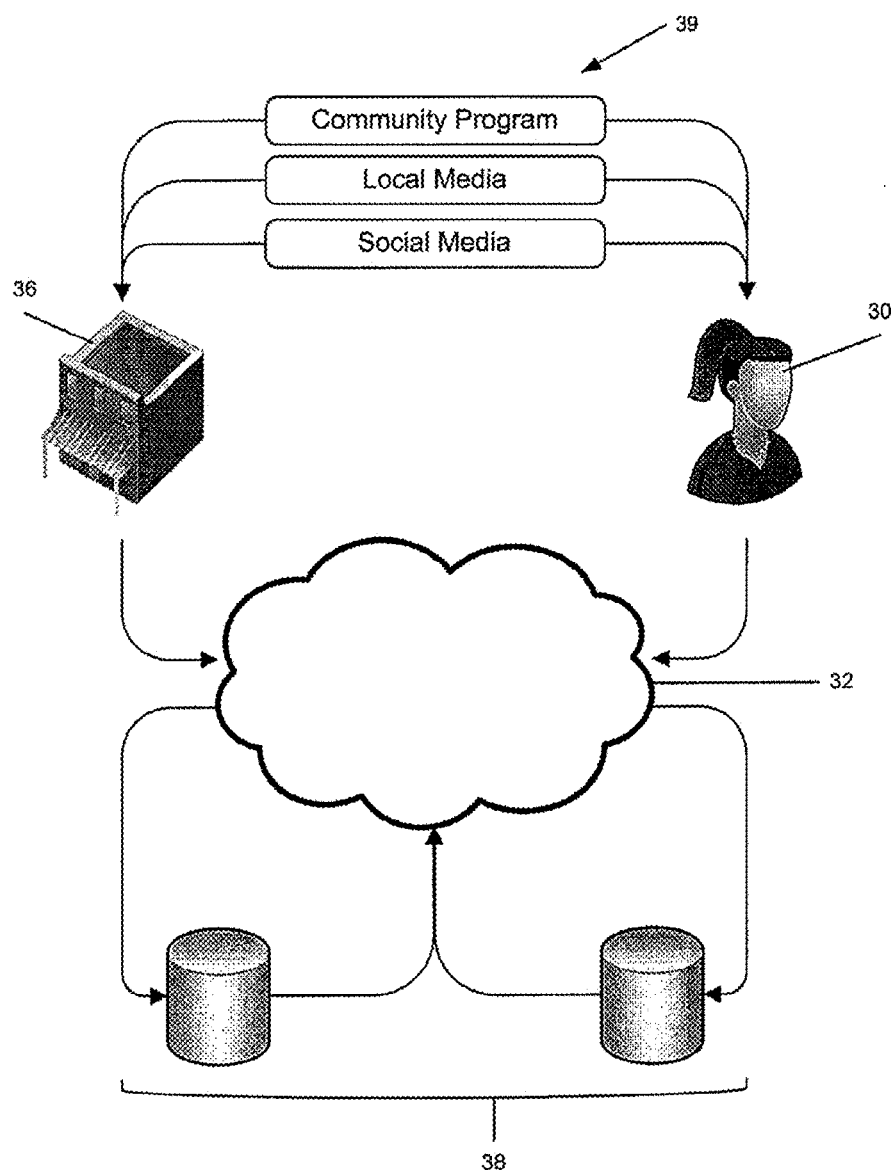
FIG. 5 is a systems view of a data transfer between a merchant, a member, the marketing system and a data storage area.

As shown in FIG. 5, a merchant 36 may register with a marketing program of various implementations to become a participant. Registration may be facilitated by one or more registration means as described in more detail below. Registration may further occur through an interface 32, for example, such as a web page, etc. Information regarding the merchant, for example, such as the merchant's name, its brick and mortar store locations, its website and web page information, and other details may be provided by the merchant at registration, or at any later point, and stored in the data storage area 38.

In one implementation, the market program attempts to detect that a member is likely to have: (i) conducted a first, in-person, transaction with a merchant; (ii) not conducted any prior transactions with the merchant; (iii) the member resides in a community in which the in-person, transaction with the merchant was conducted; and (iv) never received a unique URL in a communication by which the member can gain access to an incentive from the merchant, or has received a unique URL to access an incentive from the merchant but has never followed by unique URL. Given this service provided by the marketing program to merchants, each merchant may develop merchant incentives, and may communicate these by way of communications bearing a URL unique to each member.

In one implementation, a marketing program may provide an automated online boarding means or a manual boarding means. For example, a merchant having an existing registered merchant identification with another pre-registered financial program may be provided with a registration interface by the present marketing program, for example, such as a web page. The interface may include a means whereby merchant transactional information and preferences may be imported from the pre-registered financial program to the marketing program. The imported information may be stored in the data storage area as part of the merchant profile.

As an example, the imported information may include the merchant identification (such as an identification number), credit card information, or automated clearing house billing information already linked to a database. Additionally, the one or more forms of payment used with the pre-registered financial program may also be linked to the marketing program as tokens. Said tokens may be used to track transactions made with the associated forms of payment.

A merchant may request a list of members, based on a variety of criteria, including proximity of the location of a member to one or more locations of a merchant, member preferences, member age, or other member information. A skilled reader will recognize the variety of criteria that may be applied to a member search undertaken by a merchant, such as, for example, demographic or preference information as reflected in the marketing system data stored in the data storage area. This information may be utilized to determine the members that an incentive will be communicated to. The information may also be used to create new incentives.

In one implementation, the data mining tool, and in some instances the analytic mode, may be utilized to provide suggestions of possible new incentives to merchants. The transaction linking facility may be utilized to provide analysis or evaluations that may also be applied by the data mining tool or analytic mode to generate new incentives and suggestions of new incentives for merchants. This feature of various implementations may utilize any of the data and/or information in the data storage area, it may also: recognize incentives utilized by merchants in the past; recognize the success of some past incentives; evaluate the success of an incentive and the community program that the incentive is to be used with; and further incorporate other information and criteria. The result may be one or more suggestions of incentives that a merchant may utilize at a particular point in time. It may be at the discretion of the merchant to adopt and utilize one or more of the suggested incentives, or not to adopt or utilize any of the suggested incentives. For example, a merchant may allow automatic approval of system generated incentives, and whereby the marketing system undertakes the approval of system generated incentives. A skilled reader will recognize that a variety of criteria and information may be utilized by such a feature of various implementations.

The incentive may provide an inducement for the member, or other customers, to visit the merchant's online content where the incentive is redeemed upon clicking the unique URL. The merchant may thereby increase the number of customers, the notoriety of the merchant's store, sales, goodwill, etc. The incentive may also produce a benefit for the community program if it is linked to a community program by, increasing awareness of the community program, increasing attendance at a community program, increasing donations to the community program, etc. Specific benefits accruing to any of a community program, merchant, member and/or any intermediary may be recognized by a report, review, results, list, etc., provided by the data mining tool, or the transaction linking utility in some instances.

Incentives may be created to be redeemed upon a variety of events and/or activities. For example, an incentive may be provided to a member and/or an intermediary based upon a transaction. In this example, the incentive may be provided upon a transaction occurring, or may be provided to attempt to cause a transaction to occur. Such an incentive may be a discount on a purchase price of a product or service to a member, a give-away to a member, a sweepstakes entry and/or a donation to a community program.

As another example, incentives may also be provided based upon the completion of a survey by a participant. Such an incentive may be: a coupon that is electronically, or otherwise, provided to a participant after a survey is completed; a donation that is made to a community program upon the completion of a survey; and/or entry in a sweepstakes. It may be possible that more than one incentive may be provided to one or more participants upon the completion of a survey. It may also be possible for particular post-transaction surveys to even result in different incentives being provided to one or more participants in accordance with the answers provided in the survey. For example, the response to an experience rating question (e.g. a request to rate an experience as excellent, satisfactory or poor) could result in a participant responding that his or her experience was poor may receive a different incentive than a participant responding that his or her experience was excellent. In particular, a participant who has ranked his or her experience as poor on several post-transaction surveys may receive a different, augmented incentive. A skilled reader will recognize that a variety of other incentives may be provided to participants upon the completion of a survey.

The marketing system of various implementations may be operable by the merchant to generate incentives, to track transactions, and to provide other information relating to participants and community programs. The marketing system of various implementations may further be operable by the merchant to generate analytic information providing an evaluation of the success of past incentives and other activities of the merchant.

Intermediary Registration, Interface and Functionalities

In one implementation, one or more intermediaries may register with the marketing system and thereby become participants. In one implementation, a participant, and particularly an intermediary, may be a financial card provider, one or more advertising associates, one or more charities, one or more public or private interest groups, marketing specialists, one or more community programs, or other groups or individuals.

Particular participants may offer unique and specific means of communicating an incentive to participants and/or third parties. Intermediaries may either work with such participants, or may provide unique and specific means of communicating an incentive to participants and/or third parties themselves.

In one implementation, particular marketing program access may be configured to benefit one or more intermediaries. The access provided to intermediaries, or groups of intermediaries, may differ. For example, an advertising associate may be granted access to parts of the marketing program that are necessary for the advertising associate to work with a merchant to produce an incentive. As another example, a marketing program interface may be configured to provide access to a charity to part of the marketing program. That interface may enable a member, or other participant, to select one or more charities and allocate contributions or donations to a charity, for example, such as in percentages or contribution tiers (where the first X dollars benefit supported organization A, the next Y dollars benefit supported organization Y, etc.), or a combination thereof, to one or more charities. A skilled reader will recognize that implementations may involve a variety of other contribution priority schemes and/or a variety of marketing program interfaces to provide specific access to particular intermediaries.

In an implementation, one or more intermediaries may also disseminate intermediary affiliate information to the marketing program, or information regarding the marketing program and/or any merchant incentive to its affiliates. For example, an intermediary may send direct mail to its affiliates, which may represent its existing contributor base if the intermediary is a charity, or financial card holders if the intermediary is a financial card provider. A skilled reader will recognize that the affiliates of an intermediary may be different groups in accordance with the type of intermediary. The direct mail may contain a website address and a participant identifier which may be generated for and associated with the intermediary by the marketing program when the intermediary registers with the marketing program. Upon receipt of the direct mail, an affiliate may navigate to the website address, which may be a portal to the marketing program. The affiliate may thereby be granted temporary, and possibly limited access to the marketing system for a specific purpose.

The direct mailing from the intermediary may also provide the affiliate with the opportunity to register as a member of the marketing system. During the registration process, the affiliate may enter the participant identifier. The act of entering the participant identifier may cause the marketing program to automatically configure the new member's preferences in accordance with rules created to cause specific operations upon the entry of the participant identifier. For example, entry of the participant identifier may cause the member's preferences to include information to provide for specific interaction between the intermediary and the new member, the new member and a merchant, the new member and a community program, or any other interaction. The interaction may include a contribution by the member of certain benefits to the intermediary, or to another participant, at a specific period in time, or upon a specific event. The entry of the participant identifier may further have the result that it signals to the marketing program that new member's personal information may be transferred via an electronic link to information regarding the new member available from another data source. The transferred information may be stored as part of the new member's profile in the data storage area.

In one implementation, at the point of registration with the marketing program, a member may identify a relationship to the intermediary. In another implementation, the intermediary may post a list of validated people affiliated with its organization and the marketing system may match any registering member to an intermediary list.

Members Registration, Interface and Functionalities

Individuals may register with the marketing program to become members. Registration could be facilitated by one or more registration means. For example, the individual may already be associated with a pre-registered program, such as, for example a financial program or a program of an intermediary whereby the individual is an affiliate of the intermediary. The pre-registered program may have one or more pieces of personal (identification) or demographic information associated with the individual available in a data source. A registration interface may be provided, this may include a page, for example, such as a web page, a page sent to an individual's mobile device (e.g., such as a smart phone, etc.), etc., whereby the individual approves joining the marketing program of various implementations. The registration interface may include a means for importing all personal or demographic information and preferences from the pre-registered program to the marketing program of various implementations.

In one implementation, if the pre-registered program involves one or more identifications the one or more identifications may also be transferred to the marketing program. For example, if the pre-registered program is a financial program one or more forms of payment linked to the pre-registered financial program could also be linked with the marketing program of various implementations to enable the marketing program to track transactions made with those forms of payment. In this manner the one or more forms of payment, or other identifications, may provide one or more participant identifiers linked to the new member for use by the marketing program. All registration data, including the one or more participant identifiers, may be stored in the data storage area, and may be accessible by the data mining tool.

As shown in FIG. 5, in another implementation, an individual 30 may register with the marketing program of various implementations by providing, through an interface 32, for example, such as a web page, a page provided on an individual's mobile device (e.g., such as a smart phone, etc.), or other interface, the individual's personal or demographic information. This information may include the individual's gender, the individual's age, the individual's location (e.g., home, workplace, or other location), as well as other demographic or personal information. The information may be stored in the data storage area and may be stored as a member profile. The marketing program may generate a participant identifier number for the new member. All registration data, including the participant identifier, may be stored in the data storage area 38 of various implementations, and may be accessible by the data mining tool.

In one implementation, a participant identifier card may be sent to the new member bearing the participant identifier number. A skilled reader will recognize that the participant identifier card need not be a physical card, but could be any form of payment device, including for example an RFID chip, a mobile phone, etc. depending on, for example, the supporting infrastructure of merchants.

The marketing program of various implementations may be operable to receive information from the member, at the point of registration, as well as at any other point while the member is a member of the marketing program of various implementations. Profile data may be collected by way of a variety of means, for example, such as a web page, a mobile device, a survey, transactions between members and merchants, or any other means. Said profile data may include a set of rich data including information that is additional information to that which is gathered at the point of initial registration. Said rich data may include a variety of information, for example, such as a list of the social networks the member is linked to, authentication information for those social networks (e.g. member names, passwords, etc.), preferred supported organizations and merchants (as described more fully below), transaction details for transactions undertaken by the member, survey data, any reviews generated by the member (e.g., merchant reviews, product reviews, or other reviews), updated location data, or other information. The information may be relevant to enabling optimal usage of the marketing program.

In one implementation, the data mining tool may be operable to identify members who may be inclined to utilize incentives defined by merchants. This identification process may occur in accordance with the rules of the marketing program and/or the analytic mode, and may be based on administrative criteria, for example, such as demographic targeting of incentives.

The loyalty engine as described herein may be operable to communicate the merchant incentive to the identified members.

A skilled reader will recognize that the architecture of the marketing program may enable shielding of the personal information of all members from individual merchants. Shielding may be the result of the application of a security system linked to or otherwise integrated with the architecture of the marketing program and in particular with the transaction linking facility, the data mining tool and the data storage area. The marketing program administrator may be in control of the personal information and may be the sole party having direct access to such personal information. The personal information of a member may be accessed by the data mining tool, but any review, report, list, results or other data generated by the transaction linking facility, data mining tool or analytic mode, may be devoid of identifiable personal information, for example, any results of the data mining tool may be anonymized.

The loyalty engine may be operable to permit a member to create a review of a merchant or product. The loyalty engine may further be operable to permit other participants to create reviews as well. The reviews may be created based upon a template, or in response to rules of the loyalty engine, so that the member views a template, or a set of questions and merely responds to the template or questions. The template or questions may be accompanied by an option for free-form creation of a review, such as a space where the member may type a review, or portion of a review. Reviews may be available through the marketing program so that other participants may access the reviews. For example, reviews may be available on an electronic bulletin-board, via specific webpages, via a search, or through any other means. In some embodiments of various implementations a member may be provided with an incentive or other reward by the marketing system upon the creation of a review.

In one implementation, one or more questions on a survey may be dynamic and may be generated to be specific to a member. For example, one or more survey questions to be included on a survey to be provided to a specific member may be generated based on data relating to that specific member stored in, or accessible by, the marketing program. As another example, one or more survey questions to be included on a survey to be provided to a group, class or category of members (for example, such as a group of boarded members, or other groups, classes or categories of member) may be generated based on data relating to the specific group, class or category of member stored in, or accessible by, the marketing program. Still another example, one or more survey questions may be generated to gather information regarding behavior of users or members and may be used as a source of information that provides a richer underpinning to consumer behavior analytics of the marketing program, in particular behavior relating to a transaction that may facilitate the analysis of the likelihood of a link between behavior of a member or a user, such as a transaction. A skilled reader will recognize the other uses of survey questions directed to extract information that may be analyzed to produce behavioral data relating to a member or a user.

Yet another example of specifically generated survey questions may include questions after a member provides negative review regarding a merchant. A survey generated upon a subsequent transaction involving the member and the merchant may include questions that are devised to indicate whether the experience of the member during the transaction with the merchant improved during the subsequent transaction as compared to the transaction for which the member provided a negative review.

In embodiments of various implementations, the marketing program may be operable to support contribution priority schemes. The following represent examples of possible contribution priority schemes that may provided in various implementations. As one example, the marketing program interface may be operable to allow a member to modify his or her contribution preferences either at any time, or after particular periods of time. Another example is that the marketing program interface may be operable so that a community program, a foundation or other disseminating entity may register as an intermediary of various implementations. A member may provide a benefit (e.g., a donation or other benefit) to one or more intermediaries (e.g., the community program, the foundation or other disseminating entity), either directly, or through a merchant.

Figure 6:
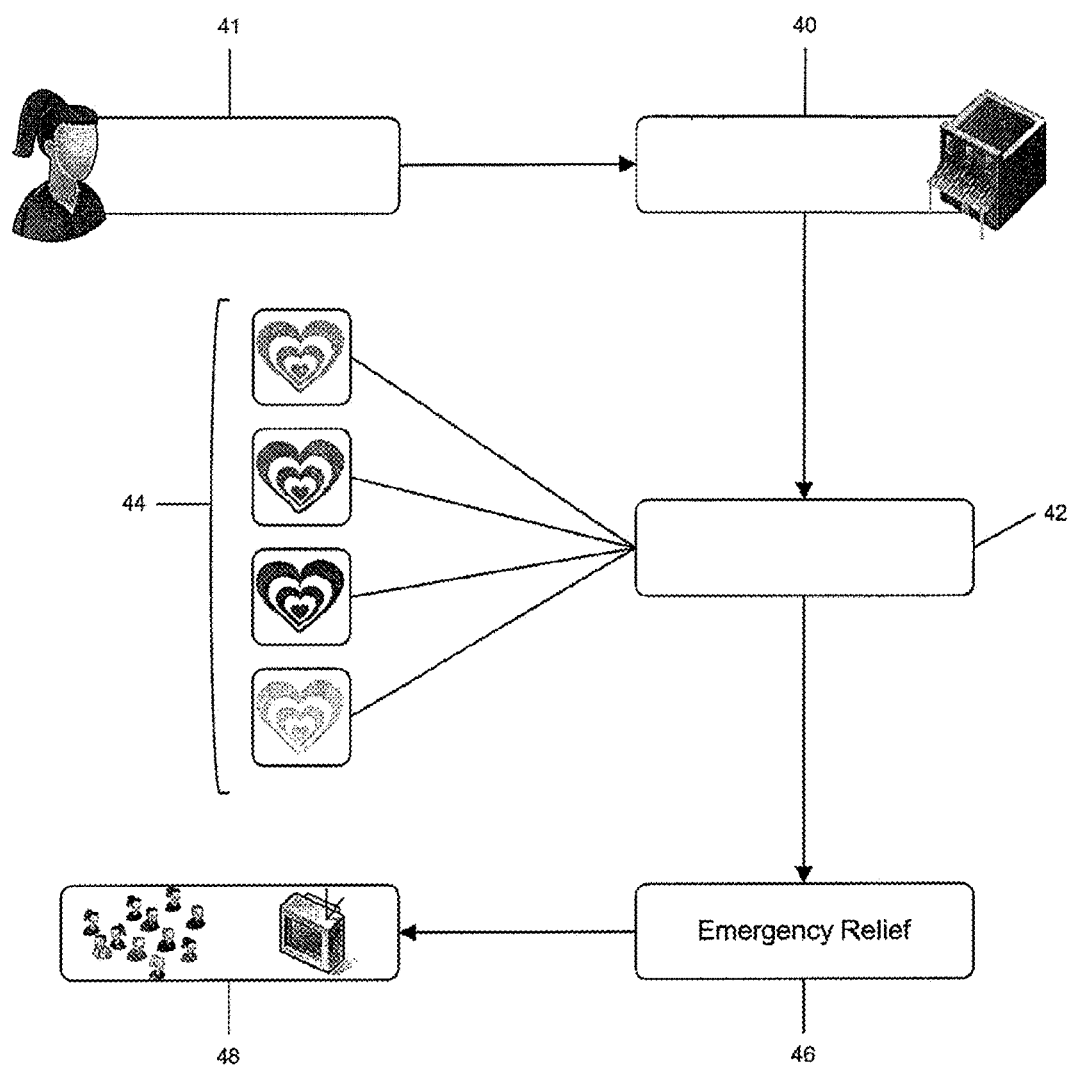
FIG. 6 is a systems view of a transfer of donations by the marketing system.

For example, as shown in FIG. 6, the benefit may be generated based upon a transaction between a member 41 and a merchant 40 in accordance with a merchant incentive, such as an incentive that provides a donation to an intermediary based upon a transaction. Once the benefit is received by the intermediary 42 (e.g., the community program, the foundation or other disseminating entity) the intermediary may either accept the benefit, for example if the intermediary is a community program. Or, if the intermediary is not a community program or other group that is to receive any benefit, then the intermediary may disseminate portions of, or the whole of, the benefit to one or more organizations 44, for example, such as charities, community programs, etc. The intermediary may also determine in some instances to redirect portions of, or the whole of, the benefit to an organization such as an emergency relief organization. The decision to redirect the benefit, or portions thereof, in this manner may be due to an emergency (e.g., such as the Haiti earthquake). Information outlets 48, for example, such as the media and social networks, etc., may disseminate information about the support for the organization 46 and build goodwill for the merchant.

In another implementation, a member may choose to match one or more donations that are generated based upon transactions with merchant stores. For example, the member may indicate to the marketing program that: all donations based upon transactions involving the member should be automatically matched by the member through the operation of the marketing program; that donations based upon transactions involving the member pertaining to one or more specific community programs, to one or more specific merchants, or to all community programs and/or merchants, during a specific period of time (such as during a period of emergency, during a particular campaign of a community program, or during any other period of time) should be matched automatically by the member through the operation of the marketing program; or that donations based on transactions between the member and one or more specific merchants should be automatically matched by the member through the operation of the marketing program. A skilled reader will recognize that other options for a member provide a matching donation through the operation of the marketing program may also be possible.

In yet another implementation, an intermediary may choose to match donations generated in one or more regions. For example, the intermediary may indicate to the marketing program that: all donations based upon transactions involving all merchants should be automatically matched by the intermediary through the operation of the marketing program; that donations based upon transactions pertaining to one or more specific community programs, to one or more specific merchants, or to all community programs and/or merchants, during a specific period of time (such as during a period of emergency, during a particular campaign of a community program, or during any other period of time) should be matched automatically by the intermediary through the operation of the marketing program; or that donations based on transactions involving one or more specific merchants should be automatically matched by the intermediary through the operation of the marketing program. A skilled reader will recognize that other options for an intermediary to provide a matching donation through the operation of the marketing program may also be possible.

As yet another example, the marketing program interface may provide to the member one or more intermediary codes that, when entered by the member into the interface, could automatically configure particular dissemination rules whereby one or more specific benefits may accrue to one or more intermediaries, charities, community programs, etc. The dissemination rules may be recognized by the loyalty engine.

A skilled reader will recognize that these examples are not exhaustive, and other possible contribution priority schemes and specific interfaces for particular intermediaries may be provided. The contribution priority schemes of various implementations may be operable to produce a transparent, accountable transfer of donations or other benefits.

Survey, Review, List, Report, etc. Generator

To aid in the collection of data stored in the data storage area, and the generation of reviews, reports, lists, results and other data generated by the transaction linking utility, data mining tool or analytic mode, the loyalty engine may generate surveys to be completed by members or other participants of the marketing program of various implementations. Such surveys may provide questions specifically created to derive information directed to the function of the marketing system, to particular transactions or transactions generally, to any merchant, intermediary or community programs, or to any other information relevant to the marketing system. Such surveys may be provided when a participant registers with the marketing system, or at any other point in time, such as after a transaction, following a merchant incentive offering, etc. Surveys may be provided to participants by a variety of means, including through web-pages, upon logging into the marketing program, via a mobile device, as a printed survey at the merchant location, or via any other means.

In one implementation, a post-transaction survey may be provided to a member involved in a transaction. The post-transaction survey may include a variety of questions, but may particularly include questions regarding the influences that led to the transactions. For example, was the transaction influenced by any incentive offered by the merchant. A skilled reader will recognize the variety of questions that may be included in a post-transaction survey.

Reviews, reports, lists, results, etc., based on the surveys can be generated for merchants. For example, survey results that indicate particularly good or bad service by a specific merchant, or particularly good or bad quality of a product, or any other information, may be identified by the data mining tool and the information may be summarized, or consolidated into a review of the merchant, product, or other element to be reviewed. In this manner reviews may be automatically generated by the marketing system, alternatively reviews may be generated upon request by a participant or third party. Reviews may also be created by participants, based upon a template or in a free-form manner. A skilled reader will recognize that the use of reviews, reports, lists, results, and other documents may be wide and varied.

Local, Regional and/or National Applications

In some embodiments of various implementations, the marketing programs may operate to produce local benefits, regional benefits and/or national benefits to the participants. For example, implementations may be operable to permit a member to participate in the marketing program in one location, region, nation, etc. Yet implementations may further permit a member who is travelling, relocating, or is otherwise interested in another location, to participate, automatically, or upon request, in the marketing program in another location, region, nation, etc. Merchants that have an international, national, multi-regional, or multi-locational presence may be associated with the marketing program. Specific store locations associated with a merchant may be recognized as existing within a specific location, so that in the locational, or regional operation of the marketing program the stores locations may be associated with the corresponding community programs of the marketing program.

For example, an incentive may be applicable to one or more store locations of the merchant. An international incentive may be applicable to a community program that is international, such as Right to Play®, and said international incentive may be honored by all of the merchant's store locations in the world. A national incentive may be applicable to a national community program, such as the Canadian Olympic Torch Relay®, and said national incentive may be honored at all of the merchant's store locations within a particular nation (e.g., all Canadian store locations of The Bay®.) A regional incentive may be applicable to a regional community program, such as the Vancouver Olympic Games®, and said regional incentive may be honored at all of the merchant's store locations within a particular region (e.g., all store locations of The Bay® in the City of Vancouver, British Columbia, etc.). Smaller locational incentives may also be provided that are applicable to a more localized location, such as a festival held in a park, and said localized incentives may be honored at all of the merchant's store locations within the specified location (e.g., store locations bordering the park where the festival is held, store locations on a street where a street festival is held, etc.).

A skilled reader will recognize that merchants of various sizes may be a participant in the marketing program of various implementations. The marketing program may be operable to permit a community program and/or specific merchant store(s) to associate with the marketing program and receive benefits. Neither the community program nor the merchant need have a national presence. Merchants and community programs that do not have a national presence may enjoy lower national public recognition. This lower public recognition may have resulted in reduced benefits to the community program and/or local merchant store(s), since neither may be recognized beyond a small location and therefore a small number of donators/contributors/attendees/consumers/etc. Participation in the marketing program of various implementations may provide participants with the benefit that members gain awareness of community programs and/or merchant store(s) occurring in their local area. This awareness may augment the notoriety of the community program and/or the merchant store(s). The awareness may further have other benefits, described herein, including increased attendance at a community program and/or increased sales at a merchant's store.

As described in this patent application, implementations may have a variety of embodiments, one such embodiment may involve a merchant committing to donate a portion of its revenue from transactions at a one or more store locations involving members to a community program, said community program being local to the merchant store(s) where the transactions take place. The donation portion of the revenue amount may be based on various parameters. Said parameters may be tracked by the marketing program. The marketing program may operate so as to utilize the tracked transaction information to calculate the amount a merchant is to pay to a community program in accordance with the promised donation. The donation amounts may additionally be trackable and reportable in a clear manner upon request, so that the transfer of the donation amount is obvious and is possibly unencumbered by transfer fees. In this manner this implementation may enable community programs and merchants to participate in the marketing program in a manner that is cost effective to all parties of the marketing program.

In another implementation, the marketing program may be operable to permit a merchant to offer different contributions to designated community programs. This may involve a merchant providing multiple incentives at one or more store locations to members, and at least two of the multiple incentives being associated with different community programs. The marketing program may be operable to track the multiple incentives and/or the different contributions by merchants to designated community programs. The factors that may be tracked by the marketing program, said factors may determine the type of contribution to be made by the merchant to a community program and/or the merchant incentive to be applied to a transaction, may include one or more of the following: the time of day when a transaction occurs; the day of the week when the transaction occurs; any member demographics; any transaction history; any incentive details, for example, such as a coupon, provided at the time of the transaction; and the community program details. A skilled reader will recognize that other factors may be utilized by the marketing program to define and track contributions by merchants to community programs and/or merchant incentives.

Boarding Means

In one implementation, to facilitate batch customer acquisition a boarding means may be provided to operate to allow a third party and/or intermediary to associate itself with the marketing program. The intermediary may be, for example, an online retailer having a customer base with user accounts, an online payment provider also having a customer base with user accounts, an online advertiser, or any other online presence having a customer base with user accounts. The intermediary could also be a company and the members to be acquired by the marketing program could be the employees of the company. The marketing program may make the boarding means accessible to the intermediary by, for example, a user interface for creating the association. The intermediary may desire to associate with the marketing program for a plurality of purposes, including: increasing its own customer base to include the marketing program's members; altruistic purposes; to increase its own charitable giving for tax purposes; or to appeal to consumers and generate marketplace goodwill.

In one implementation, the boarding process may operate so that once the intermediary associates with the marketing program, the user accounts of the intermediary may automatically become associated with the marketing program. Once the user accounts are associated with the marketing program each of the users is recognized as a new member of the marketing program. The marketing program may then be operable to provide a user interface for these new members, whereby the new members may complete their profiles. The provision of this user interface may occur in any of the manners described above, for example, such as through the provision of a survey, through the provision of a particular web page, or other means. A skilled reader will recognize that It this boarding process, and the acceptance of new members generally into the marketing program, may increase the awareness of the marketing program and may significantly increase its member base. As described above, this may produce benefits for the merchants, community groups, and other intermediaries participating in the marketing program.

Participant Location Facilitator and Mapping Function

All members of the marketing program may be identified by the loyalty engine of various implementations as existing in a particular location. This location may be recognized as being in the vicinity of areas associated with particular community programs. In accordance with the scope of the community programs this area may have a perimeter that encompasses a wide or narrow territory. For example, the member may be recognized as existing in a location that is within an area that is a neighborhood, or an area that is a country. In embodiments of various implementations, it may be possible for the marketing program to recognize a member as existing in a single location (e.g., a home address), or multiple locations (e.g., a home address, a work address and/or other addresses, such as a cottage address).

In one implementation, a mapping means may be operable to allow a member or other participant to request a map showing merchants that are participants of the marketing program located in, or near to, an area that encompasses a location of the member. The marketing program may utilize the data mining tool to identify a location of the member from the member profile (e.g., the home address of a member), the marketing program may ask the member to choose a location if multiple locations are in the member profile (e.g., choose a home address or a work address of the member), or the marketing program may accept a location inputted by the member as the location of the member. The area of the map may be adjustable to show various sized areas. The marketing program may also be operable to allow a member to specify categories or types of merchants to be shown on the map (e.g., restaurants, clothing stores, hardware stores, etc.). A skilled reader will recognize that other parameters may be included in the requested query.

Figure 7:
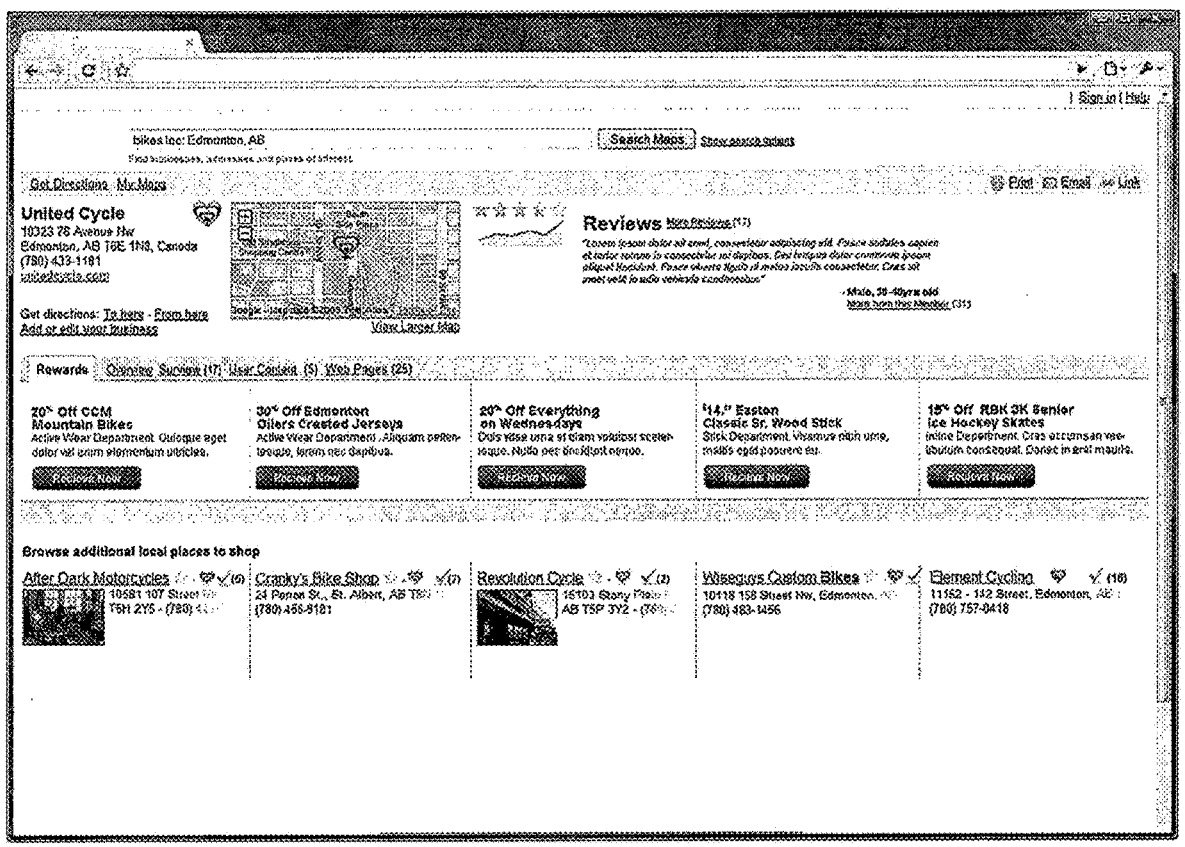
FIG. 7 is a screen view of a merchant information web page.

Implementations may generate a map based upon the member map query. The data mining tool may be utilized to identify any merchants and/or community programs located within the area of the map. An example of a map 50 of various implementations showing merchant information is shown in FIG. 7. This is just one example of possible maps that may be generated by implementations, and a skilled reader will recognize that other map displays or other map outputs may be possible.

Maps generated by implementations may show the merchant store(s) existing in, or near to, a location or area. The map may additionally show the location of any community programs occurring at the time when the query is sent (e.g., such as a street festival in the area, or a clothing drop-off located on a street). The map may have other facilities as well. For example, the map may indicate, may be by way of a symbol or color indicator, that particular merchants are offering merchant incentives.

The map may also permit information regarding merchants, community programs and/or merchant incentives to be accessed by a participant, for example, such as by a display that appears when a mouse is held over where the merchant and/or community program is shown on the map, or by a clickable access to information (e.g., clicking the merchant location accesses the merchant web page or a summary of merchant information, etc.), or other information access and/or display means. The displayed or accessed information may include the location of a merchant store and/or a community program, the dates when a community program is occurring, the date(s) for a merchant incentive, and any other information. The displayed or accessed information may be provided in accordance with rules of the marketing program. A skilled reader will recognize that implementations may include other options of visually displaying or accessing information regarding merchants, community programs and merchant incentives in a specific location.

Still other embodiments of various implementations may be operable to recognize the location of a member at a point of time. For example, a GPS system on a mobile device in the possession of a member or other participant may send location information to the marketing program. In this embodiment the marketing program may provide a member with information regarding merchant incentives pertaining to the location of the member at a point in time. (For example, a member who travels on vacation to New York City may be recognized by the marketing program as existing in New York City because the marketing program can read the location of the member based on a GPS feature or application linked to the smart phone in the possession of the member. The member may then submit a query to the marketing program requesting information about merchant restaurants local to the location of the member in New York City at the time of submitting the request. The marketing program may generate a map showing merchant restaurants in the vicinity of the location of the member submitting the request in New York City. The function and capabilities of the map may be as are described above.)

Registration of Participants and Data/Information Collection

The method of various implementations may involve an administrator collecting information regarding community programs. The administrator may utilize automated means to locate community programs. Information regarding the community programs, for example, such as the dates, times, events, purpose of the community program, may be stored in the data storage area. The information collected regarding each community program may include details necessary for an individual to attend a community program, as well as details regarding the purpose, history or aims of the community program. All community program information may be stored in the data storage area. The information collected and stored for each community program may include details regarding the location where the community program operates or events relating to the community program are held.

The community program information may be displayed in a variety of means, such as in a list of community programs, a calendar showing the dates of community program events, or in any other means.

Members and merchants may register with the marketing program of various implementations. The process of registration may involve the members and/or merchants providing certain information to the marketing program. This information may be saved in a profile for each member and/or merchant. The profile information may include a variety of types of details, but may also include a participant identifier. The participant identifier may be retrieved from organizations or programs the merchant and/or member is previously involved in, for example, such as a BIN number, a financial card number, or a transaction number. Alternatively the participant identifier may be randomly generated and applied to the profile by the marketing program. Additional information may be collected regarding participants due to activities (e.g., transactions, reviews, etc.) and/or the provision of additional information by participants (e.g., by direct input, survey responses, etc.).

Some members may be boarded into the system, so that such members are not required to individually enter initial profile information. Profile information may be transferred to the marketing program for members that have previously been involved with other organizations or programs form said organizations or programs. If boarding occurs the individual member will be required to activate the profile in order to register with the marketing program.

Figure 8:
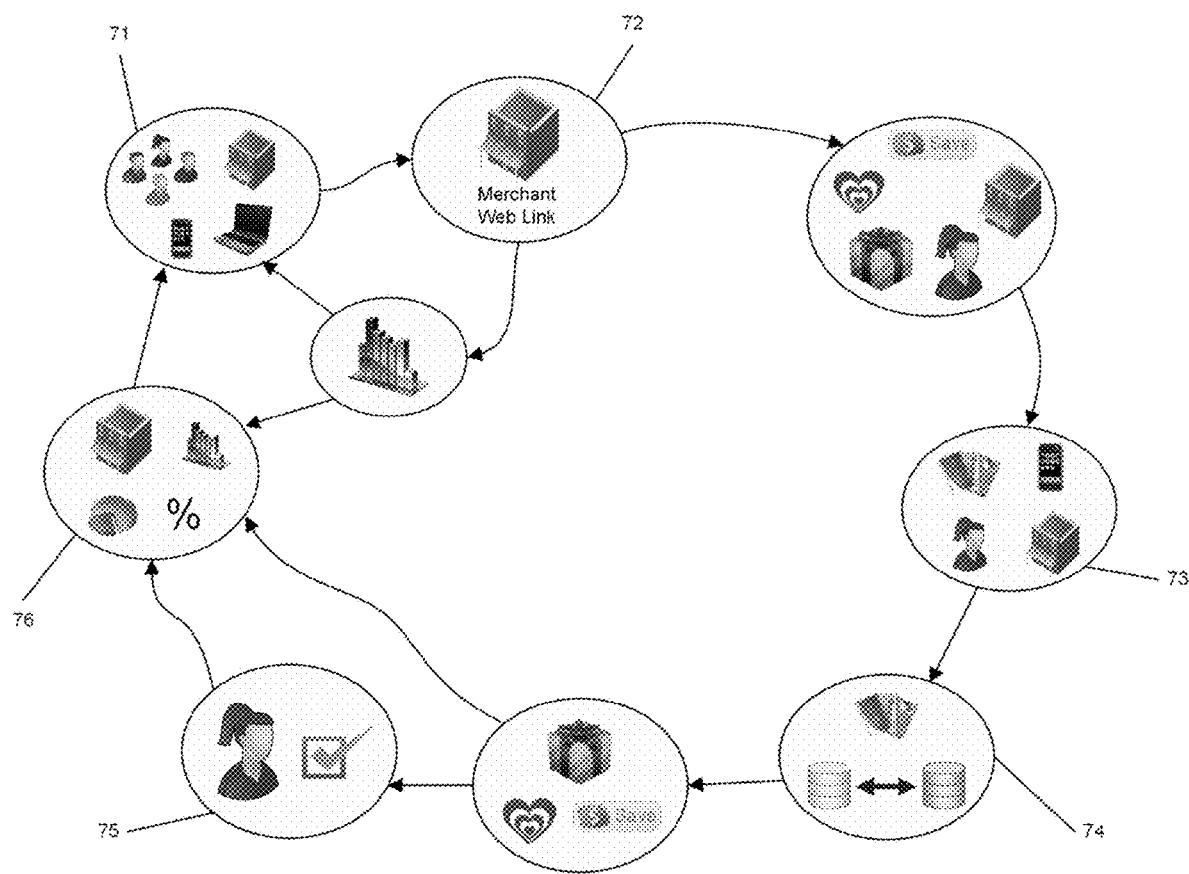
FIG. 8 is a view of the flow of one embodiment of the marketing program generating members through a boarding process.

A boarding process, such as is shown in FIG. 8, may be utilized for example for employees of a company or a financial card provider. In this example, the company or financial card provider may decide to join the marketing program, for example, the company or financial card provider may join as an intermediary and thereby have partial participation in the marketing program. The company or financial card provider may make available information regarding all of its employees or financial card holders for boarding purposes. The employees or financial card holders may be provided with a registration activation code. Once the employee or financial card holder provides the registration activation code to the marketing program the member registration is complete for the employee or financial card holder who then becomes a member 71 of the marketing program. In this example, the participant identifier for the members could be an employee number or a financial card number. This information would be transferred in the boarding process. Alternatively, an employee or financial card holder may be required to watch an informational video regarding the marketing program, or view other information prior to becoming registered as a member. A skilled reader will recognize the variety of means of registration that may be utilized to register a boarded member with the marketing program.

After registration members may access merchant information 72 regarding one or more merchants through the marketing program, as described in this specification. The member may request and access specific information regarding a merchant, for example, such as information regarding merchant products, services and/or incentives. The member may also review information pertaining to the member, such as any amount of rewards (such as reward points) accumulated by the member, member profile information, etc. The member may engage in transactions with the merchant 73, as a result of accessing information regarding a merchant or for other reasons, and the transactions may occur online or offline. Information regarding the transaction may be transferred to the marketing program 74, and the transaction linking utility may be utilized to confirm that a member is eligible for a merchant incentive. The matching may utilize details of the transaction or other member details stored in the data storage area in conjunction with the transaction details, for example, such as merchant incentive information, the identification of a member, financial card information, or other information, to identify when a member is eligible for a merchant incentive.

The transfer of information from a merchant to the marketing program for an online transaction may occur in a variety of ways. For example, the information may be transferred via an information link existing between the marketing program and the online site where the transaction occurred. If the online site where the transaction occurred is accessed through the marketing program website, an information link may automatically transfer the information regarding the transaction to the marketing program. In other instances, the marketing system may be capable of searching the merchant online transaction information stored in the merchant's server to identify transactions involving members of the marketing program or any merchant incentive. In one embodiment, upon a merchant transaction a notification may be sent to the marketing system to search the merchant's transaction information, or the search may occur at any interval or time after the transaction. It may also be possible for the merchant site to transfer information to marketing system at regular intervals when there is relevant transaction information reflecting transactions involving either members or merchant incentives. Any transfer of transaction information or search of transaction information may occur either in real-time in relation to the transaction, or at any time after the transaction occurs. A skilled reader will recognize that a variety of other means and/or methods of transferring transaction details to the marketing program during or after an online transaction occurs may be applied in implementations.

The transfer of information from a merchant to the marketing program for an offline transaction may occur in a variety of ways. The point of sale device of the merchant may be operable to transfer transaction details to the marketing program, either during a sale, for example in real time, or after one or more sales as an upload. Alternatively, the merchant may have a system whereby an electronic report of the transactions is generated and transferred to the marketing program either automatically or upon a specific activity of the merchant. As yet another option, the marketing system may provide a screen whereby a merchant may fill-in transaction details and thereby provide the transaction details to the marketing system. A skilled reader will recognize that a variety of other means and/or methods of transferring transaction details to the marketing program during or after an offline transaction occurs may be applied in implementations.

Implementations may involve other means of transferring online and/or offline transaction information to the marketing program. For example, a transfer means may be integrated with a point of sale device used in the transaction, whereby the information is captured by the point of sale device and transferred to the marketing program by the point of sale device. As another example, data feeds may be generated by one or more merchant acquirer or payment processor (for example, such as Moneris® and the merchant acquirer or payment processor may transfer the data feeds to the marketing program. As yet another example, data feeds may be generated by one or more card issuers (for example, such as the Royal Bank of Canada®, Toronto Dominion Bank®) and the card issuer may transfer the data feeds to the marketing program. As still another example, data feeds may be generated by one or more card associations (for example, such as Visa®, MasterCard®, etc.) and the card association may transfer the data feeds to the marketing program. As yet another example, data feeds may be generated by one or more data aggregators and the data aggregator may transfer the data feeds to the marketing program. A skilled reader will recognize that other options may be available for transfer of information to the marketing program, including any combination of any of the examples provided above.

As the capture and storage of transaction details, for both online and offline transactions, may be critical to the effectiveness of various implementations, the marketing program may incorporate a means of obligating and/or otherwise requiring merchants to provide transaction details to the marketing program. For example, the provision of full and complete transaction details to the marketing program may be written as an obligation in any contract whereby the merchant becomes a participant of the marketing program. The administrator may check whether a merchant is meeting this obligation, for example by checking incentives against the transactions, or by any other checking means. A skilled reader will recognize that other means of requiring merchants to provide transaction details may also be applied.

Moreover, a merchant may consider itself to be obligated to provide transaction details due to a recognition that the marketing program is significantly more effective when robust transaction details are provided by all participating merchants, as the transaction details can be utilized to assist merchants to derive information regarding consumer behaviors, and other information. As is described herein, the information of the marketing program may be utilized for a number of purposes, including attracting a larger clientele, creating new incentive programs and other uses. These uses can create significant benefits for merchants, and for this reason, or to meet other obligations or requirements, the merchants may be inclined to assist by providing transaction details to the marketing program. After each transaction by each merchant is completed, the transaction data may be processed. This may involve accruing a donation to a community program, if a donation was incorporated into a merchant incentive generated by the transaction.

In one implementation, a post-transaction survey 75, seen in FIG. 8, may be generated and disseminated to the member. The member may respond, and in particular may confirm whether the transaction occurred as a result of the member reviewing the merchant information through the marketing program.

At any point it may be possible for participants to request information from the marketing program 76, as a report, result, review, etc. This request for information or other data query may engage the analytic mode in some circumstances. A skilled reader will recognize that the results of the request for information or other data query may be utilized for a variety of purposes, including for example, identifying transactions occurring in a manner that indicates the transaction occurred as a result of the member receiving information regarding the merchant through the marketing program.

Intermediaries may register with the marketing program of various implementations and thereby gain limited access to the program functions and the marketing program data. For example, an intermediary may be a community group interested in limited access for the purpose of looking at the merchant incentives offered pertaining to the community group event. Or the community group may be interested in limited access for the purpose of generating lists of merchants and/or members that may be invited to attend a community program event (such as a fund raising dinner). The list may include local merchants and/or members, or merchants and/or members who have characteristics in their profile that suggest they may be interested in supporting the community program. As another example, an intermediary may be a marketing associate who is working with one or merchants to create merchant incentives relating to community programs. The marketing associate may be granted limited access to some of the data and a certain activities of the data mining tool, to generate information to aid the marketing associate in creating a feasible merchant incentive relating to a community program. As yet another example, an intermediary may be an organization, such as a company or a financial card provider. The organization's participation in the marketing program as an intermediary may provide a link whereby the organizations its associates direct involvement in the marketing program as merchants and/or members.

After the point of registration additional information pertaining to participants in the marketing program may be gathered through a variety of means. For example, a survey may be provided to a participant and completing the survey may generate data that is transferred and stored in the data storage area. Other means of entering information into the marketing program may also be provided to a participant, such as a web page. Surveys and other data input means may be provided to a participant through a variety of means, for example, such as a mobile device, a web page, or other means.

Possible Data Mining

After registration a merchant may consider possible incentives to implement at a merchant location and/or online. This decision may involve considerations of relevant community programs, possible incentives, cross-loyalty and/or cross-selling groups.

The marketing program may provide query and/or searching assistance whereby a merchant may use a template search query, and the search query may include drop down menus showing search options, to derive information from the marketing system. The template may be utilized by the data mining tool and/or analytic mode to generate a particular result, such as a report, list, incentive suggestion, community program link suggestion, cross-selling suggestion, cross-loyalty suggestion, or other results. A skilled reader will recognize the variety of results that may be derived from the data and/or information in the data storage area, as well as the variety of search query templates that may be provided to a merchant by the marketing system. The results may be utilized by the merchant to make decisions, such as, for example choosing incentives to implement, choosing to form cross-selling groups, choosing to form cross-loyalty groups, choosing community programs to link with, etc.

Information and other data collected by implementations may be stored in a manner whereby the information is easily mineable by a variety of participants and/or third parties, including local businesses. The data mining tool, and optionally the analytic mode, may be utilized to generate or otherwise derive results that may be utilized by merchants or other business owners to determine indicators of successful incentives and other business generators in a specific geographic area. For example, the results of various implementations may indicate why one merchant location may get more business than another merchant location or other business location, such as the type of incentive offered (e.g., balloons are offered as an incentive at one merchant location and since these appeal to kids the mothers shopping with their kids will frequent that merchant location which is significant because mothers represent the majority of shoppers in that geographical area; or people living in a particular area may be likely to leave on extended vacations to their cottages during the summer months and on weekends during the rest of the year and therefore may be unlikely to visit some types of merchants during these times; etc.). A skilled reader will recognize the many uses that may be made of the information and data collected by implementations and the fact that such information is generally available for data mining and analytic uses.

In one implementation, the data mining tool may access information and/or data in the data storage area, and may also access information and/or data from other data sources, which may be outside the marketing system, such as data sources (e.g., databases, hard disks, etc.) controlled by intermediaries, other participants, or third parties. Access to these other data sources may be recognized by the template, by the analytic mode, or by other rules utilized by the marketing system.

A merchant may utilize the data mining tool to identify community programs occurring or to occur in the future, in the vicinity of one or more merchant store locations. The merchant may then devise and develop a merchant incentive for the one or more stores that are local to the community program, said merchant incentive being created to specifically relate to the community program. For example, the relation between the community program and the merchant incentive may function so that upon a transaction between a merchant and a member, a donation may be made to the community program. The transaction between a merchant and a member may be the point at which a merchant incentive is honored, which may involve providing a tangible benefit to a member (such as a prize, sweepstakes entry, or a discount), transferring a benefit to a community program (such as a donation), or another activity. The transaction information may be transferred by the merchant, for example, such as by the merchant's point of sale interface, to the marketing program, and a transaction linking utility may be utilized to confirm that the merchant and member are participants of the marketing program, and that the member qualifies for one or more merchant incentives. A skilled reader will recognize that the merchant incentive may of various types, a coupon, a discount, entry in a sweepstakes, a prize, a donation to a community program, and that a variety of other merchant incentives are possible.

The merchant incentive may be tailored to reflect the specific relationship between a community program and a merchant, aspects of either the merchant or the community program, demographics of local members, etc. Information generated by the data mining tool may assist with the tailoring of a merchant incentive.

A variety of links may exist between participants of the marketing program and these links may be recognized in the data storage area. The links may also develop relationships between participants. Additionally the links and/or relationships may guide and direct the experience of participants of the marketing program. Links may further be created whereby a merchant may be linked to the marketing program brand. Another possibility is that links are created between the merchant program and social media (e.g., Facebook, Twitter, etc.), whereby social media may be utilized to promote merchants, merchant incentives, community programs and/or the marketing program.

In one implementation, to allow participants to access information regarding the marketing program, the marketing program functions, and to generate queries and/or requests for information, the marketing program may be presented as a website, having a main page and several pages attached thereto. The pages may reflect particular functions of the program, such as reward look-ups, maps of merchants and/or community programs, calendar pages showing community events and/or merchant incentives, links to merchants and/or community programs, access to merchant incentives available to a member, etc. The web pages may facilitate presentations viewable by participants and/or non-participants of the marketing program.

In one implementation, certain triggers may be set to initiate particular activities of the marketing program. For example, triggered activities may include: data mining in accordance with set rules; sweepstakes processing; donation distribution to community programs or other intermediaries (e.g., such as charities); post-sale feedback; and enhanced analytic mode of the data mining tool. Additionally, particular reports may be produced at regular, specified intervals. Any activity of the marketing program may be initiated upon request, whether a trigger or a specified interval is set for that activity or not.

Figure 9:
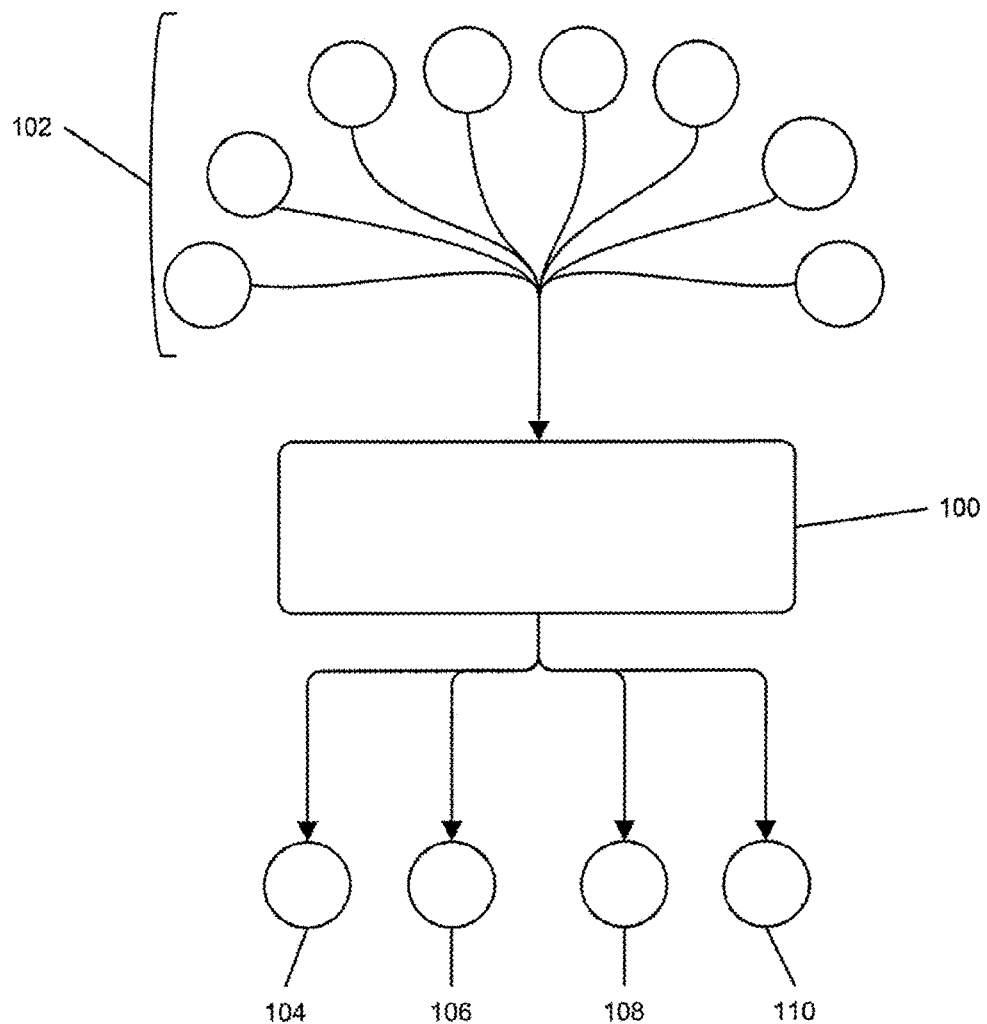
FIG. 9 is a system diagram showing the marketing system outputs that may be generated by the data mining tool, and sometimes the analytic mode, in embodiments of various implementations.

As shown in FIG. 9, in one implementation, a variety of inputs and outputs may be provided to and generated by the data mining tool. The inputs and outputs may also be affected by whether the data mining tool engages the analytic mode. For example, the data mining tool, and possibly the analytic mode, may access data or other information that is either stored in the data storage area of the marketing system 100, or may access information from other data sources 102, such as remote databases of intermediaries, merchants or other third parties that the marketing system is permitted to access. The data mining tool, and possibly the analytic mode as well, both of which are elements of the marketing system, may be operable to provide an output 104 that provides suggestions of incentives to a merchant, or group of merchants. The data mining tool, and possibly the analytic mode as well, may also provide other types of reports 106 or other documents as an output. The data mining tool, and possibly the analytic mode as well, may further be operable to generate one or more survey questions 108 as an output to be directed to members. Such survey questions may be dynamic questions, such as whether the transaction occurred on a weekend or a weekday.

A skilled reader will recognize that other results 110 may be generated by the data mining tool, and that these other results may be any of a wide-variety of results.

The data mining tool may access and utilize a variety of information in the course of it processing, such as any of the following, or any combinations of the following: transaction details; member demographics; post-transaction survey responses; responses from any other survey provided by the marketing system, for example, such as market research surveys, etc.; merchant details, including any merchant preferences, merchant store geographical locations, merchant capacity, merchant inventory, merchant target markets, or any other merchant information; seasonal behaviors of any participants of the marketing program, or any other users that data is collected for and transferred to the marketing system; weather trends of forecast information provided to, or accessed by, the marketing system; and any other information or data. A skilled reader will recognize that a variety of other data or information may also be available from the marketing system data storage area and may be utilized by the data mining tool, and in some instances by the analytic mode as well.

The information and data may be processed by the marketing system, and in particular by the transaction linking utility, the data mining tool, and in some instances by the analytic mode as well, to provide specific outputs. For example, the outputs may be any of the following: feedback regarding any success and/or failures of incentives associated with a merchant; feedback regarding any success and/or failures of incentives associated with similar merchants in non-competing geographical areas, if sufficient information regarding similar merchants is provided to, or accessed by, the marketing system; comparisons of incentives associated with a merchant and incentives associated with similar merchants in non-competing geographical areas, if sufficient information regarding similar merchants is provided to, or accessed by, the marketing system; feedback regarding success rates and trends from associated platforms, such as web advertising, traditional media (e.g., print, radio, television, etc.), if sufficient information regarding such associated platforms are provided to, or accessed by, the marketing system; and feedback regarding consumer behavior or members or users. A skilled reader will recognize that a data or information may also be provided to, or accessed by, the marketing system and utilized by the transaction linking utility, the data mining tool, and in some cases the analytic mode as well, to provide a variety of other outputs as well.

A skilled reader will recognize that a variety of reports or other documents may be generated by the data mining tool and in some instances the analytic mode as well. For example, such as incentives statistics or incentive trends, to provide details of incentives communicated, incentives redeemed, incentive effectiveness on a cost/return basis, and incentive effectiveness on a traction basis. As another example, success of associated platforms that may include web advertising, traditional media (e.g., print, radio or television) may be provided if information or data regarding associated platforms is provided to, or accessed by, the marketing system. Still another example is output that provides analysis and behavioral data relating to consumer activities of members or users. As yet another example, survey statistics, trends and conclusions may be generated, so that the marketing system may provide comprehensive reporting of survey data acquired and any correlations that can be made from external factors provided to, or accessed by, the marketing program. Such a correlation may be for example, that a golf course has fewer transactions on cold days. The marketing system may be operable to generate suggestions of activities that may address the correlations, generally in the form of incentive suggestions. For example, the marketing system may suggest that an incentive be offered on golfing costs when the weather is below a seasonal averages. A skilled reader will recognize that a variety of reports containing a variety of information, correlations and suggestions may be generated by implementations.

Figure 10:
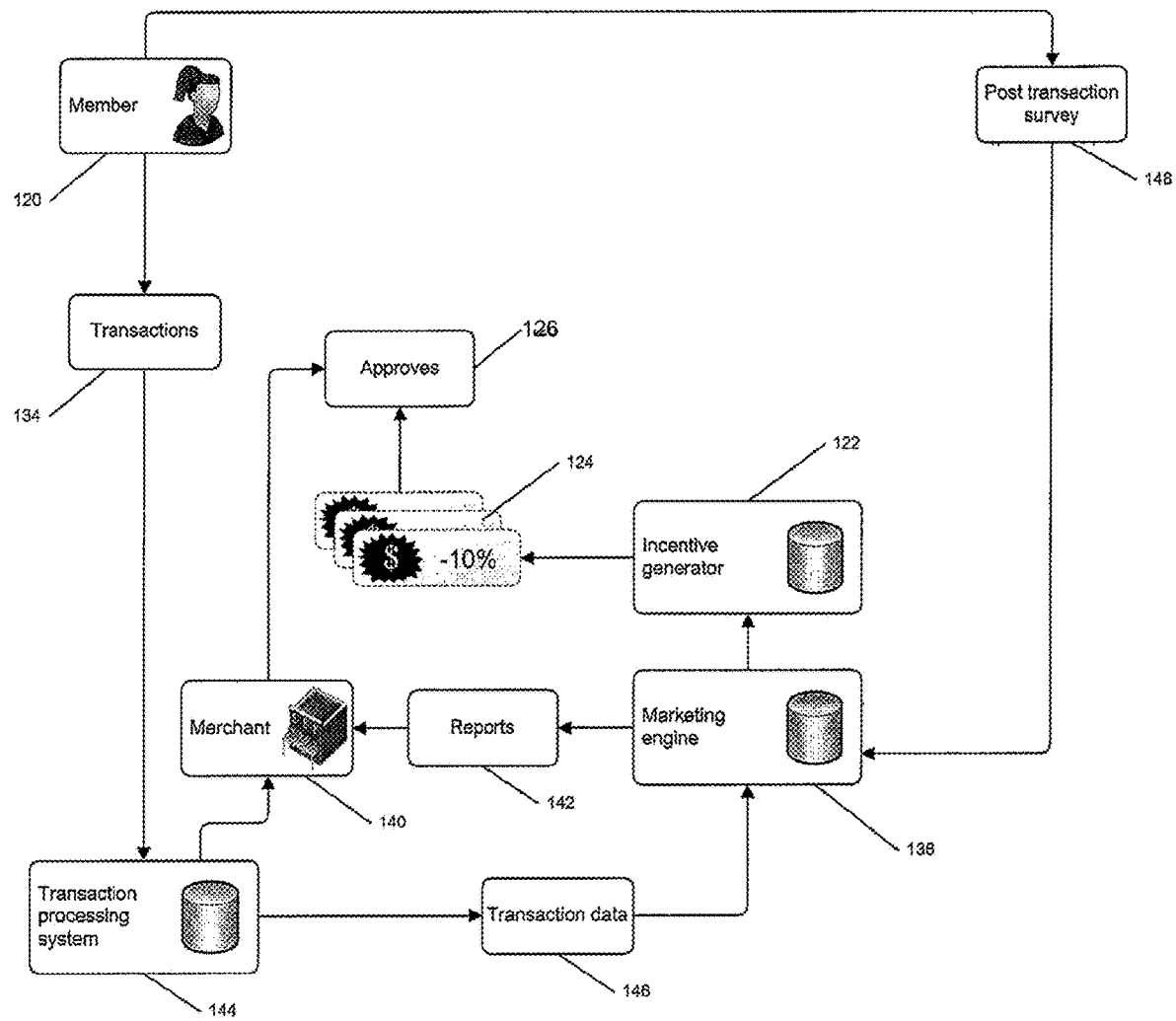
FIG. 10 is a flowchart showing the options for member interaction with the marketing program in one implementation.

As shown in FIG. 10, in one implementation, incentives may be generated based on member activities and the data or other information provided to, or accessed by, the marketing system regarding these activities. The member activity that will result in the member receiving an incentive is, in one implementation, a detection by a marketing engine 136 that member 120 is likely to have: (i) conducted a first, in-person, transaction with a merchant 140; (ii) not conducted any prior transactions with the merchant 140; (iii) the member 120 resides in a community in which the in-person, transaction with the merchant 140 was conducted; and (iv) never received a unique URL in a communication by which the member 120 can gain access to an incentive from the merchant 140, or has received a unique URL to access an incentive from the merchant 140 but has never followed by unique URL. Given this service provided by the marketing program to merchants, each merchant may develop merchant incentives, or use incentive generator 122 to develop incentives, and may communicate these by way of communications bearing a URL unique to the member 120. Thereafter, the member 120 may engage in clicking the URL in response to the incentive that was received. Details of each transaction may be provided to a transaction processing system 144, such as a point of sale device, or any other means. The transaction details may be provided by the transaction processing system to the merchant 140. The transaction processing system may generate transaction data record 146, which may be provided to the marketing system and utilized by the transaction linking facility in particular.

After then member 120 has following the unique URL, the member 120 may also conduct an e-commerce transaction 134 with the merchant 140, the occurrence of which will be detected by a transaction linking utility. After the member 120 has been detected to have conducted the e-commerce transaction 134 with the merchant 140, the member 120 may be provided with, and gives a response to, a post transaction survey 148. A marketing engine 136 may use the post transaction survey 148, in conjunction with other information, to generate one or more reports 142 which may be provided to one or more merchants 140. The post transaction survey 148 may also be utilized with other information to generate incentive suggestions 122, which may lead to the generation of a merchant incentive 124, such as a discount, that may be approved 126 by a merchant.

The member 120, may also complete a post-transaction survey 148. The survey itself, or the survey data may be provided to the marketing system. All of the data provided to the marketing system, including the survey details, and the transaction details, may be utilized by the marketing system to generate reports, or other information, or certain activities, such as sales reports, suggestions for incentives, or incentive generation activities, as just a few examples of possible outputs of the marketing system.

Some embodiments of various implementations may be operable to generate incentives on an automatic basis. The marketing system may utilize information and data stored in the data storage area to perform particular analysis, including analysis of the effectiveness of prior incentives, as well as market trends, such as periods when sales are higher or lower. The marketing system may utilize the analysis results and other data to generate one or more new incentives. These incentives may be automatically generated and may be communicated by the marketing system pending merchant approval. Merchant approval may be manual or automatic approval. Upon approval the incentive may be auto-loaded to various media including any of the following: newspapers, brochures, flyers, specialty advertising (e.g., Val Pak®, etc.) or any other media.

A variety of information or data may be utilized by the marketing system to automatically generate one or more incentives. For example, any of the following data or information may be utilized: merchant type (e.g. merchant category, services and/or products provided, service vs. product based merchant, etc.); location of merchant stores and geographical location; history of a merchant's experience with past and present incentives (customer acceptance, feedback about the incentives, contribution margin, etc.), for example incentives that generate the most interest, as indicated by the incentives being rated highest by users and members in post-transaction surveys, or as indicated by a comparison of incremental sales data following the incentive being posted; successful incentives in areas that are non-competing geographical areas; and member demographics tied to transaction history and trends.

Automated incentive generation may be based on a variety of criteria, for example it may be based on specific customer segments. Such customer segments may include as an example: targeted local neighbourhoods; customer demographics (e.g., gender, age, etc.); financial card BIN range, as this may determine if the card is a regular card, gold card, platinum card, etc., and the type of card may provide details regarding the card holder and the likely transactions to be conducted by the card holder; buying history of users, members, or other customers.

The incentives that are automatically generated may be related to several elements and/or factors. As an example, automatically generated incentives may be related to any of the following: a season; one or more days of the week, or of the month; special events, including holiday seasons (e.g., the Christmas season, etc.) and celebrations (e.g., parades, a community event such a run for a cause, etc.); or local events (e.g., little league finals, town street festivals, etc.). The success or effectiveness of an incentive may be determined based on any of the following: the statistics regarding whether an incentive is redeemed; post transaction feedback regarding the incentive, such as feedback derived from a post-transaction survey; and increased sales from a group of consumers targeted by an incentive, or during a period of time that is targeted by an incentive.

Transactions

Transactions between merchants and members may occur online or offline. A transaction will be recognized as occurring between a merchant and a member because the member will utilize at least one of the identifications recognized as belonging to the member by the marketing program. The merchant may also utilize at least one of the participant identifiers recognized as belonging to the merchant by the marketing program.

As an example of an online transaction, such a transaction may occur in a website environment, whereby a member purchases an item or service from a merchant through a series of clicks, or other online means of purchasing an item or service. The website will transfer the transaction information to the marketing program. In some instances the information may be transferred to the marketing program by a third party. The marketing program will recognize the transaction as occurring between a member and a merchant due to the use of the participant identifiers.

As an example of an offline transaction, a member may visit a merchant's store location and may undertake a transaction to purchase an item or service from the merchant. The transaction may involve a point of sale device that will transfer information regarding the transaction, including the participant identifiers to the marketing program. A transaction that does not involve a point of sale device may be recorded by another means and the transaction details, including the participant identifiers, may be transferred or manually entered into the marketing program. The transaction details may be transferred to the marketing system by a third party in some instances. As set forth above, techniques for determining if a brick and mortar transaction (e.g., other than an 'card not present' transaction) was conducted are disclosed and enabled in US Patent Application Publication No. 20150142544, titles "Systems And Method For Incenting Consumers", Ser. No. 14/408,199, which has been incorporated herein by reference.

Depending upon the form of transaction, the transaction may be recognized by the marketing program in real-time, near-real time or after a time lapse. Transaction details may be matched to a member profile by the data mining tool or other element of the loyalty engine, and the transaction details may be stored to the member profile in the data storage area. Following a transaction a post-transaction survey may be communicated to a member, for example, via a web page, via email, via a mobile device, etc. The post-transaction survey may gather feedback from the member. In some embodiments of various implementations the post-transaction survey may be anonymous, and the information collected from the survey may be stored in a manner linked to the merchant in the data storage area. This data may be utilized by the data mining tool and the analytics mode. Post-transaction survey results may be generated by the data mining tool and may be provided to participants of the marketing program.

A merchant may utilize information generated by the data mining tool and possibly the transaction linking utility, both of which utilize the data stored in the data storage area, to devise, define and develop a merchant incentive. In one implementation, an intermediary, such as a marketing associate, may be involved in developing or communicating a merchant incentive. Either or both of the merchant and the intermediary may access information generated by the data mining tool for the purpose of creating the marketing incentive, or analyzing the effectiveness of a marketing incentive once it is completed. A group of merchant incentives may further be analyzed for the purpose of creating more effective merchant incentives in the future.

Information may be collected pertaining to participants in the marketing program upon the event of transactions between a merchant and a member. Such information may be transaction details, and may further include details regarding any related merchant incentive. As described above a merchant incentive may be related to a community program and therefore may be available at one or more merchant stores that are within the vicinity of the community program. (The vicinity may be of various sizes, a community park area, a neighbourhood, a city, a county, a province or state, a country, etc.) The merchant incentive, or information about the merchant incentive, will preferably communicated to a member via a communication to a logical address to which the member has access. The communication will include a URL unique to the member which, when followed, gives the member access to an incentive from a merchant.

It will be appreciated by those skilled in the art that other variations of the embodiments described herein may also be practiced without departing from the scope of the invention. Other modifications are therefore possible.

What is claimed is:

1. A data collection server operable by one or more computer processors implemented for promoting one or more merchants of a marketing program to one or more members of the marketing program, each of the one or more merchants having a corresponding merchant profile that includes a geographical location and each of the one or more members having a corresponding member profile that includes a geographical location, wherein the one or more member profiles and the one or more merchant profiles of the marketing program are stored on a data storage device, each of the one or more member profiles including a participant identifier of the corresponding member, the data collection server comprising:

means for detecting an occurrence of, and receiving or accessing data associated with, a transaction associated with a merchant of the one or more merchants on an account issued to an account holder who is one said member, wherein:
    the transaction occurs in a payment processing system that includes an acquirer for a merchant, an issuer for an account holder, and a transaction handler telecommunicating between the acquirer through a first access point to the transaction handler and between the issuer for the account holder through a second access point to the issuer for the account holder;
    the account was issued to the account holder by the issuer for the account holder;
    the transaction on said account is acquired for clearing and settlement by the acquirer for the merchant through the transaction handler in communication with both the issuer for the account holder and the acquirer for the merchant;
    the issuer for the account holder sends an authorization request for the transaction to the merchant through the transaction handler;
    the acquirer sends, in response to an authorization request, an authorization response from the merchant through the transaction handler to the issuer for the account holder;
    information from the detected said transaction is derived from the authorization response to communicate that the transaction between the merchant and the account holder on the account issued to the account holder is authorized by the issuer for the account holder and includes participant identifiers associated with each of the merchants and the account holder who is the one said member; and
    telecommunications through the transaction handler, the first access point, and the second access point are used for authorization, clearing, and settlement of the transaction;
  means for assessing whether the respective geographical locations of the merchant and the account holder who is the one said member with the participant identifier are in a same vicinity by way of a predetermined navigation time algorithm using a predetermined mode of transportation to determine that a travel time therebetween, using the predetermined mode of transportation, is within a predetermined time limit;
  means for determining with a level of certainty whether the transaction was a first said transaction between the merchant and the account holder who is the one said member with the participant identifier;
  means, based on the determined level of certainty, for generating one or more incentives for the account holder who is the one said member with the participant identifier, wherein the one or more incentives are accessible via a Universal Resource Locator (URL) unique to the member with the participant identifier;
  means for communicating the URL to a logical address corresponding to the account holder who is the one said member with the participant identifier;
  means for monitoring, receiving, and storing in the data storage device, electronic signals representing data related to online user activity of the one or more members to detect the online user activity of the account holder who is the one said member; and
  means for triggering, as a result of detecting the online user activity of the account holder who is the one said member with the participant identifier, a determination of whether the member with the participant identifier followed the URL.

2. The data collection server as defined in claim 1, further comprising means for determining with a level of certainty whether the transaction was conducted in-person by the account holder who is the one said member with the participant identifier.

3. The data collection server as defined in claim 2, wherein an account issued to the account holder who is the one said member with the participant identifier was used to pay the merchant for the transaction.

4. The data collection server as defined in claim 3, wherein the transaction was not a "card not present" transaction.

5. The data collection server as defined in claim 1, wherein the account holder who is the one said member with the participant identifier paid the merchant in cash for the transaction rather than via a debit account or a credit account.

6. The data collection server as defined in claim 1, further comprising means, when the respective geographical locations of the merchant and the account holder who is the one said member with the participant identifier are in a same vicinity, for assessing whether a geographical location of an affinity entity predetermined by the account holder who is the one said member with the participant identifier is in the same vicinity by way of the predetermined navigation time algorithm using the predetermined mode of transportation to determine that a travel time between the affinity entity and at least one of the merchant and the account holder who is the one said member with the participant identifier is within a predetermined time limit and if so then the data collection server further comprises means for triggering a business rule by which the merchant will make a donation to the affinity entity.

7. The data collection server as defined in claim 1, further comprising means for triggering, as a result of determining that the member with the participant identifier followed the URL, a business rule by which the merchant will make a donation to an affinity entity.

8. The data collection server as defined in claim 7, further comprising means for triggering, as a result of determining that the account holder who is the one said member with the participant identifier followed the URL, a post-transaction communication sent to the logical address corresponding to the account holder who is the one said member with the participant identifier, wherein a content of the communication is selected from the group consisting of:
  a summary of the transaction;
  a value of the donation by the merchant to the affinity entity;
  a total of donations by other said merchants due to the account holder who is the one said member with the participant identifier having conducted other said transactions with the other said merchants;
  a confirmation corresponding to one or more prize entries for the account holder who is the one said member with the participant identifier, wherein the one or more prize entries were generated due to the transaction;
  a summary of current said prize entries for the account holder who is the one said member with the participant identifier;

details of available said prize entries for the account holder who is the one said member with the participant identifier;

a confirmation of one or more incentives available for and/or received by the account holder who is the one said member with the participant identifier, wherein each said incentive is one or more of an offer to the account holder who is the one said member with the participant identifier from the merchant to:
  (i) have a discount on a future said transaction with the merchant;
  (ii) receive an entry to a sweepstake contest; and
  (iii) that the merchant will make an additional said donation to an additional said affinity entity;
and
a survey requesting a review of the member's experience with the merchant.

9. A web server comprising:
means for receiving information resulting from a transaction conducted within a payment processing system that includes an acquirer for a merchant, an issuer for an account holder, and a transaction handler telecommunicating between the acquirer through a first access point to the transaction handler and between the issuer for the account holder through a second access point to the issuer for the account holder, wherein:
  the transaction was conducted between the merchant and the account holder on an account issued to the account holder by the issuer for the account holder;
  the account holder has a geographical location;
  the transaction on said account is acquired for clearing and settlement by the acquirer for the merchant through the transaction handler in communication with both the issuer for the account holder and the acquirer for the merchant;
  the issuer for the account holder sends an authorization request for the transaction to the merchant through the transaction handler;
  the acquirer sends, in response to the authorization request an authorization response from the merchant through the transaction handler to the issuer for the account holder;
  the received information from the transaction is derived from the authorization response to communicate that the transaction between the merchant and the account holder on the account issued to the account holder is authorized by the issuer for the account holder associated with the account and includes participant identifiers associated with the merchant and the account holder; and
  telecommunications through the transaction handler, the first access point, and the second access point are used for authorization, clearing, and settlement of the transaction;
means for assessing whether the respective geographical locations of the merchant and the account holder are in a same vicinity by way of a predetermined navigation time algorithm using a predetermined mode of transportation to determine that a travel time therebetween, using the predetermined mode of transportation, is within a predetermined time limit; and
means for determining with a level of certainty whether the transaction was a first said transaction that had been conducted on the account between the merchant and the account holder;

means, based on the determined level of certainty, for generating an incentive for the account holder to conduct a second said transaction with the merchant on the account;
means for communicating the incentive to a logical address corresponding to a web-enabled mobile computing device associated with the account holder, wherein the incentive includes a link to a website corresponding to the merchant; and
means for monitoring, receiving, and storing data related to online user activity of the web-enabled mobile computing device to determine that the web-enabled mobile computing device accessed the website and used the incentive to conduct the second said transaction on the account.

10. A non-transient computer readable medium comprising software performed by the means of the web server as defined in claim 9.

11. An Internet server comprising:
means for receiving information resulting from a transaction conducted within a payment processing system that includes an acquiring bank for a merchant, an issuing bank for an account holder, and a transaction handler telecommunicating between the acquiring bank through a first access point to the transaction handler and between the issuing bank through a second access point to the issuing bank wherein:
  the merchant has a merchant profile that includes a geographical location;
  the account holder has an account holder profile that includes a geographical location and a participant identifier;
  the transaction was conducted between the merchant and the account holder on an account issued to the account holder by an issuing bank;
  the transaction on said account is acquired for clearing and settlement by the acquiring bank for the merchant through the transaction handler in communication with both the issuing bank for the account holder and the acquiring bank for the merchant;
  the issuing bank sends an authorization request for the transaction to the merchant through the transaction handler;
  the acquiring bank sends, in response to the authorization request, an authorization response from the merchant through the transaction handler to the issuer for the account holder;
  the received information from the transaction is derived from the authorization response to communicate that the transaction between the merchant and the account holder on the account issued to the account holder is authorized by the issuing bank and includes participant identifiers associated with the merchant and the account holder; and
  financial information telecommunicated through the transaction handler, the first access point, and the second access point is sufficient for authorization, clearing, and settlement of the transaction;
means for assessing whether the respective geographical locations of the merchant and the account holder are in a same vicinity by way of a predetermined navigation time algorithm using a predetermined mode of transportation to determine that a travel time therebetween, using the predetermined mode of transportation, is within a predetermined time limit; and means for determining with a level of certainty whether the transaction was a first said transaction that had been conducted on the account between the merchant and the account holder;

means, based on the determined level of certainty, for generating an incentive, accessible via a logical address corresponding to a web-enabled mobile computing device associated with the account holder with the participant identifier in the account holder profile, for the account holder to conduct a second said transaction with the merchant on the account;

means for communicating the incentive to the logical address corresponding to the web-enabled mobile computing device associated with the account holder, wherein the incentive includes a link for a Universal Resource Locator (URL) to a website corresponding to the merchant;

means for monitoring, receiving, and storing data related to online user activity of the web-enabled mobile computing device to determine that the web-enabled mobile computing device accessed the website and used the incentive to conduct the second said transaction on the account;

means for triggering, as a result of the monitoring of the online user activity of the account holder with the participant identifier, a determination of whether the account holder with the participant identifier followed the link to a website corresponding to the merchant; and means for triggering, as a result of determining that the account holder with the participant identifier followed the link to a website corresponding to the merchant, a transaction communication sent to the logical address corresponding to the web-enabled mobile computing device associated with the account holder, wherein a content of the communication is a survey.

12. The Internet sever as defined in claim 11, further comprising means for determining with a level of certainty whether the transaction was conducted in-person by the account holder with the participant identifier.

13. The Internet sever as defined in claim 12, wherein an account issued to the account holder with the participant identifier was used to pay the merchant for the transaction.

14. The Internet sever as defined in claim 13, wherein the transaction was not a "card not present" transaction.

15. The Internet sever as defined in claim 11, wherein the account holder with the participant identifier paid the merchant in cash for the transaction rather than via a debit account or a credit account.

16. The Internet sever as defined in claim 11, further comprising means for determining with a level of certainty whether respective geographical locations of the merchant and the account holder with the participant identifier are in the same vicinity.

17. The Internet sever as defined in claim 11, further comprising means for triggering, as a result of determining that the account holder with the participant identifier followed the URL, a business rule by which the merchant will make a donation to an affinity entity.

18. A non-transient computer readable medium comprising software performed by the means of the Internet server as defined in claim 11.

19. A non-transient computer readable medium comprising software performed by the means of the data collection server as defined in claim 1.

* * * * *